(12) United States Patent
Bessems et al.

(10) Patent No.: US 12,490,353 B2
(45) Date of Patent: Dec. 2, 2025

(54) SYSTEMS AND METHODS FOR PROVIDING DYNAMIC LIGHTING

(71) Applicant: CREE LIGHTING USA LLC, Racine, WI (US)

(72) Inventors: Ronald W. Bessems, Racine, WI (US); Matthew Brian Deese, Racine, WI (US); Kory Alexander Liszt, Racine, WI (US); John W. Frailey, Racine, WI (US); Shane Michael O'Donnell, Racine, WI (US); Ronald Lee Fienberg, Racine, WI (US); Thomas Richard Hinds, Racine, WI (US); Gary David Trott, Racine, WI (US); John Roberts, Racine, WI (US)

(73) Assignee: CREE LIGHTING USA LLC, Racine, WI (US)

( * ) Notice: Subject to any disclaimer, the term of this patent is extended or adjusted under 35 U.S.C. 154(b) by 83 days.

(21) Appl. No.: 17/884,190

(22) Filed: Aug. 9, 2022

(65) Prior Publication Data

US 2022/0386435 A1    Dec. 1, 2022

Related U.S. Application Data

(63) Continuation-in-part of application No. 17/082,767, filed on Oct. 28, 2020, now Pat. No. 11,419,201, and
(Continued)

(51) Int. Cl.
*H05B 45/20*      (2020.01)
*F21S 8/00*       (2006.01)
(Continued)

(52) U.S. Cl.
CPC .............. *H05B 45/20* (2020.01); *F21S 8/006* (2013.01); *H05B 45/10* (2020.01); *H05B 47/11* (2020.01);
(Continued)

(58) Field of Classification Search
CPC ........ H05B 45/20; H05B 45/10; H05B 47/11; H05B 47/115; H05B 47/12; H05B 47/175; H05B 47/105; F21S 8/006; Y02B 20/40
See application file for complete search history.

(56) References Cited

U.S. PATENT DOCUMENTS

2015/0250041 A1*  9/2015  Jobe ....................... H05B 47/18
                                                   315/151
2016/0323972 A1* 11/2016  Bora ...................... H05B 45/22
(Continued)

*Primary Examiner* — Daniel D Chang
(74) *Attorney, Agent, or Firm* — J. Clinton Wimbish; Maynard Nexsen PC

(57) ABSTRACT

Computer implemented systems and methods for providing dynamic lighting through lighting fixtures are provided herein. In one aspect, one or more characteristics of light provided from a lighting fixture or a plurality of lighting fixtures changes over time to shape the environment of an indoor space according to simulated environment illumination parameters and general illumination parameters. Dynamic lighting may improve the health or wellbeing of individuals in an indoor space, for example, by simulating an outdoor environment to reduce stress, by providing circadian entrainment to improve sleep and wakefulness, or the like. Other aspects of the present disclosure enable lighting fixtures to provide light that is synchronized with one or more other devices that simulate an environment and shape the environment of an indoor space.

19 Claims, 30 Drawing Sheets

Related U.S. Application Data a continuation-in-part of application No. 17/023,899, filed on Sep. 17, 2020, now abandoned, which is a continuation of application No. 16/259,491, filed on Jan. 28, 2019, now Pat. No. 10,830,400.

(60) Provisional application No. 62/926,862, filed on Oct. 28, 2019, provisional application No. 62/628,131, filed on Feb. 8, 2018.

(51) Int. Cl.
    *H05B 45/10*     (2020.01)
    *H05B 47/11*     (2020.01)
    *H05B 47/115*     (2020.01)
    *H05B 47/12*     (2020.01)
    *H05B 47/175*     (2020.01)

(52) U.S. Cl.
    CPC ........... *H05B 47/115* (2020.01); *H05B 47/12* (2020.01); *H05B 47/175* (2020.01)

(56) References Cited

U.S. PATENT DOCUMENTS

| | | | |
|---|---|---|---|
| 2018/0077783 A1* | 3/2018 | Sooch | H05B 45/28 |
| 2019/0242539 A1* | 8/2019 | Roberts | F21S 8/006 |
| 2021/0003260 A1* | 1/2021 | Roberts | H05B 47/12 |

* cited by examiner

```
1  {
2      "dynamic_lighting_instructions":[
3          {
4              "profile_id": 1001,
5              "destination_cct": 5000,
6              "destination_brightness": 70,
7              "transition_duration": 60
8          },
9          {
10             "profile_id": 1002,
11             "destination_cct": 5000,
12             "destination_brightness": 55,
13             "transition_duration": 45
14         },
15         {
16             "profile_id": 1003,
17             "destination_cct": 4500,
18             "destination_brightness": 4000,
19             "transition_duration": 30
20         }
21     ]
22 }
```

FIG. 5

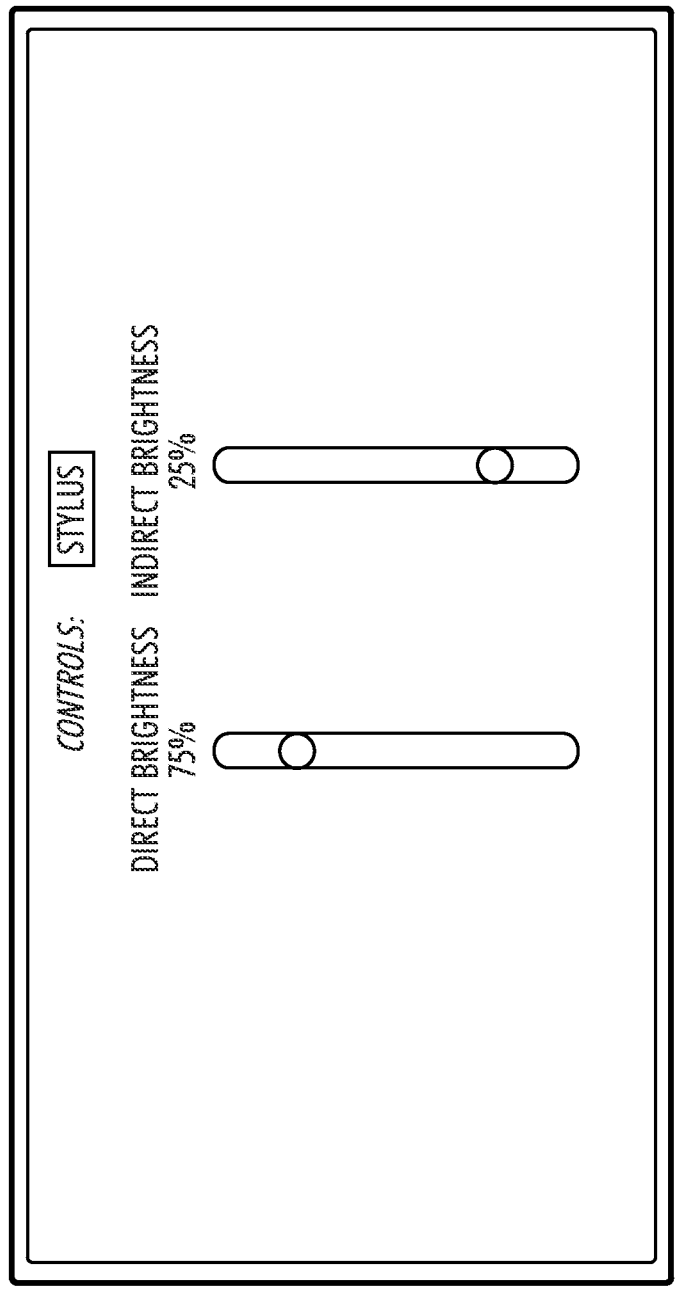

SCHOOL — CADIANT

LIGHTING | ZONES

| START TIME | DURATION | BRIGHTNESS | COLOR | SKY | SKY COLOR | SUN POSITION |
|---|---|---|---|---|---|---|
| 6:00 AM | 90 MIN | 50% | 3000K | ON | 20 | 80% EAST |
| 7:30 AM | 60 MIN | 60% | 4500K | ON | 20 | 75% EAST |
| 8:30 AM | 180 MIN | 75% | 5000K | ON | 100 | 65% EAST |
| 11:30 AM | 60 MIN | 75% | 3000K | ON | 100 | NOON |

CANCEL | ADD TRANSITION | SAVE AND ACTIVATE

FIG. 13A

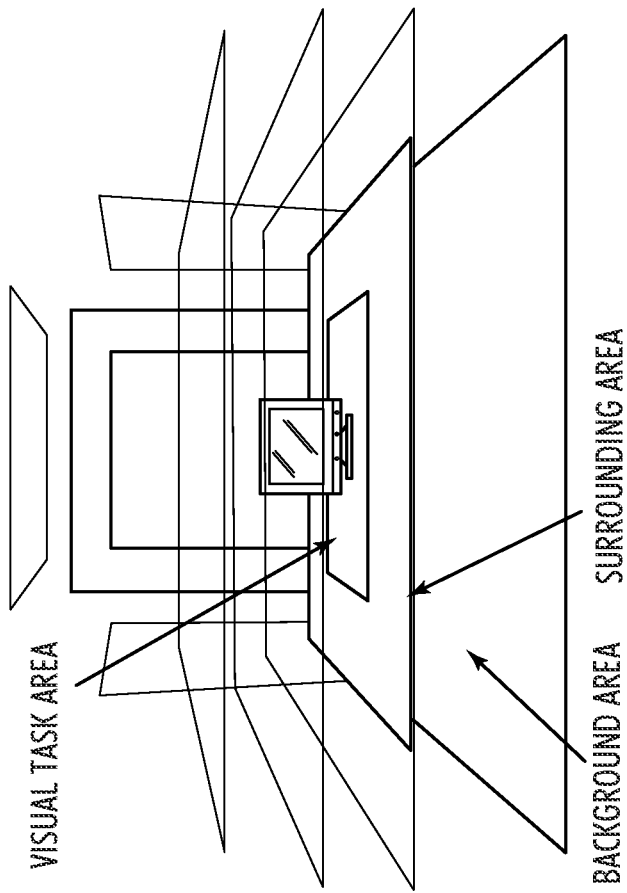
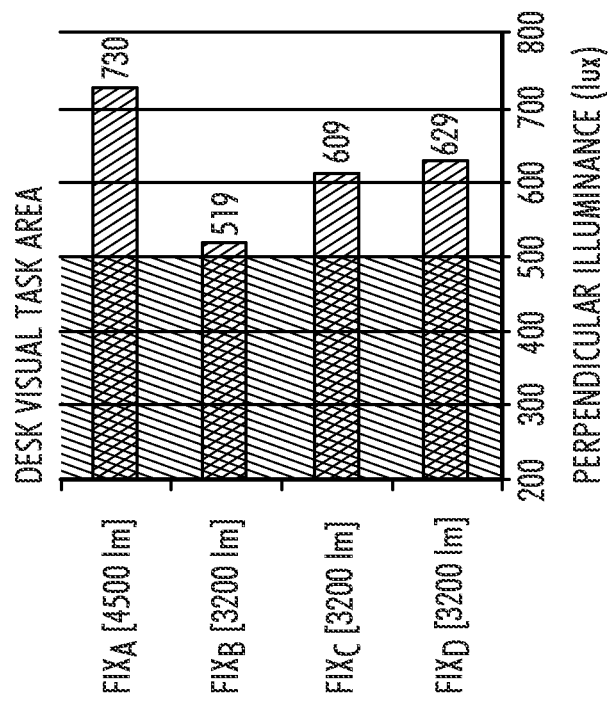
FIG.22

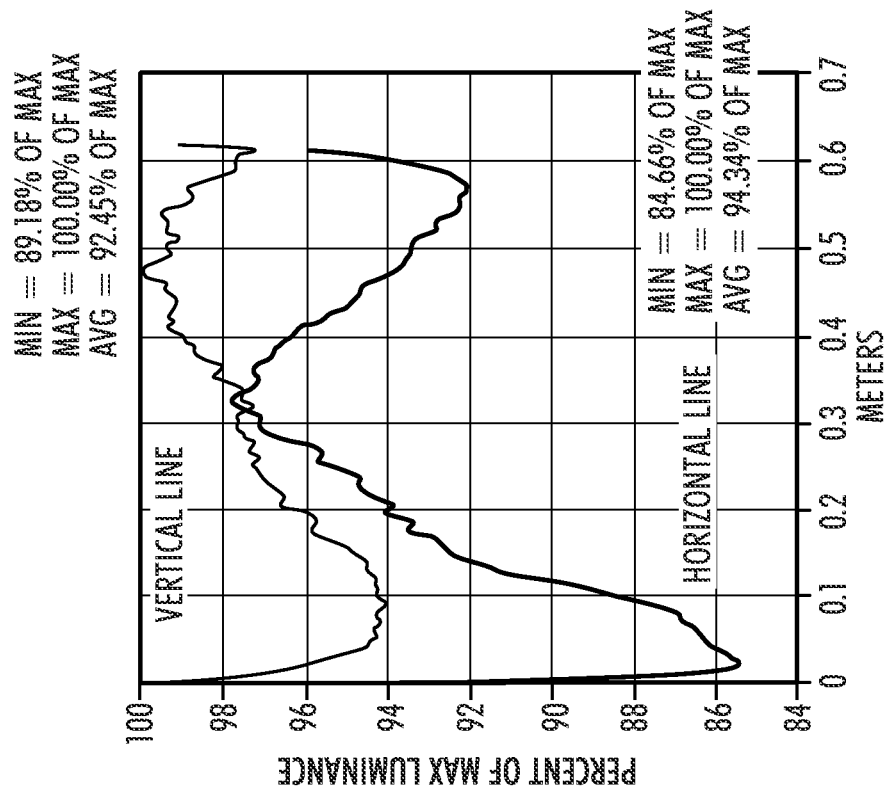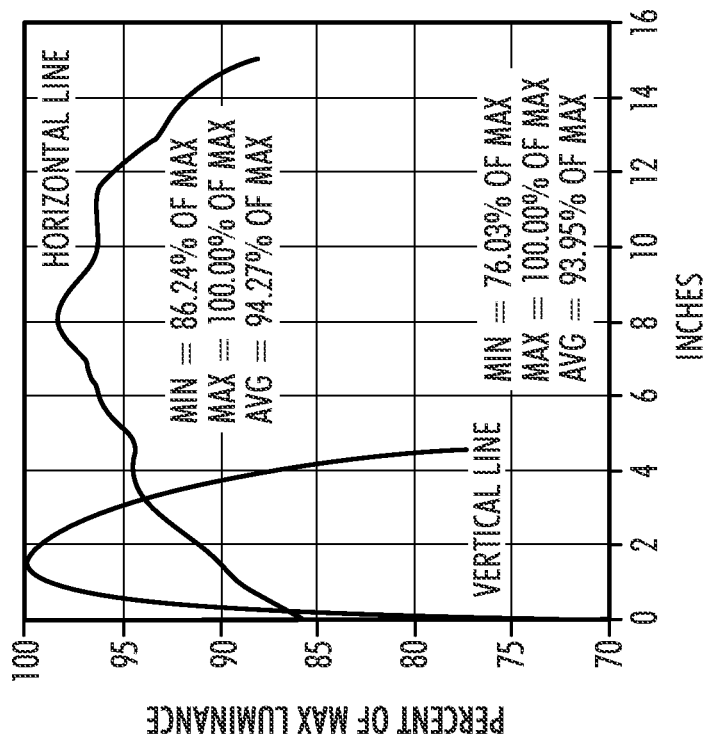
FIG. 24

SYSTEMS AND METHODS FOR PROVIDING DYNAMIC LIGHTING

CROSS-REFERENCE TO RELATED APPLICATIONS

This application is a continuation-in-part of U.S. patent application Ser. No. 17/082,767, filed Oct. 28, 2020, and claims the benefit of provisional patent application Ser. No. 62/926,862, filed Oct. 28, 2019, the disclosures of which are hereby incorporated herein by reference in their entirety.

This application is also a continuation-in-part of U.S. patent application Ser. No. 17/023,899, filed on Sep. 17, 2020, which is a continuation of U.S. patent application Ser. No. 16/259,491, now U.S. Pat. No. 10,830,400, filed on Jan. 28, 2019, and further claims the benefit of provisional patent application Ser. No. 62/628,131, filed on Feb. 8, 2018, the disclosures of which are hereby incorporated by reference in their entirety.

FIELD OF THE DISCLOSURE

The present disclosure relates to dynamic lighting wherein one or more lighting devices or fixtures provide lighting that changes over time to shape the environment of an indoor space, which further relates to methods for imitating natural environments in indoor spaces while maintaining light suitable for general illumination.

BACKGROUND

Modern lighting devices continue to evolve, including significant functionality in addition to providing light for general illumination. Many modern lighting devices include communications circuitry and form a network with one or more other devices. Leveraging the functionality of modern lighting fixtures, it may be desirable to provide dynamic lighting in which one or more characteristics of light provided from a lighting device or a group of lighting devices changes over time to shape the environment of an indoor space.

Further, studies continue to suggest a relationship between light exposure and certain mental states. One or more qualities of the light to which an individual is exposed (e.g., color temperature, color rendering index, brightness, and the like) may affect the mental state of the individual (e.g., alertness, ability to concentrate, energy level, anxiety level, and the like). Studies have also suggested a relationship between immersion in natural outdoor environments and feelings of wellbeing. However, a large percentage of the population works in indoor environments, often with little to no access to natural light. For these individuals, there is a need to create an indoor environment tailored to create one or more desired mental states and increase feelings of wellbeing.

SUMMARY

Computer implemented systems and methods for providing dynamic lighting are provided. In some aspects, the techniques described herein relate to a dynamic lighting system for simulating an environment, including: a plurality of lighting fixtures, each one of the plurality of lighting fixtures including: a light source; and computational components, including: driver circuitry configured to control the light source; processing circuitry coupled to the driver circuitry; memory coupled to the processing circuitry, the memory storing instructions, which, when executed by the processing circuitry cause the each of the plurality of lighting fixtures to: receive dynamic lighting simulation instructions, the dynamic lighting simulation instructions including simulated environment illumination parameters; generate, in response to receiving the dynamic lighting simulation instructions, light output characteristics from the light source based on the simulated environment illumination parameters via the driver circuitry configured to control the light source; and adjust dynamically, the light output characteristics from the light source over a time series, based on the simulated environment illumination parameters via the driver circuitry configured to control the light source to simulate the environment.

In some aspects, the techniques described herein relate to a system, wherein generating the light from the simulated environment illumination parameters includes the processing circuitry transmitting a signal to the driver circuitry to generate the simulated environment illumination from the light source.

In some aspects, the techniques described herein relate to a system, wherein the computational components further include communications circuitry and wherein the each of the plurality of lighting fixtures is in network communication via the communications circuitry.

In some aspects, the techniques described herein relate to a system, wherein the memory includes further instructions, which, when executed by the processing circuitry cause the plurality of lighting fixtures to: receive updated dynamic lighting simulation instructions via the communications circuitry, the updated dynamic lighting simulation instructions including an instruction to pause the generating of the light output characteristics; and adjust the driver circuitry for controlling the light source over time such that the simulated environment illumination parameters pause transitioning from a current state.

In some aspects, the techniques described herein relate to a system, wherein the simulated environment illumination parameters further include general illumination parameters, and wherein the general illumination parameters include at least a desired level of brightness.

In some aspects, the techniques described herein relate to a system, wherein the memory includes further instructions, which, when executed by the processing circuitry cause the plurality of lighting fixtures to: receive updated dynamic lighting simulation instructions via the communications circuitry, the updated dynamic lighting simulation instructions further including the general illumination parameters; and adjust dynamically, the light output characteristics from the light source over the time series such that the general illumination parameters maintain general illumination light output characteristics while the simulated environment illumination parameters dynamically adjust over the time series the light output characteristics from the light source to simulate the environment.

In some aspects, the techniques described herein relate to a system, wherein the general illumination parameters further include hue, saturation, color, color temperature, and color rendering index.

In some aspects, the techniques described herein relate to a system, wherein the simulated environment illumination parameters include hue, saturation, brightness, color, color temperature, and color rendering index that is dynamically adjusted over the time series to simulate the environment.

In some aspects, the techniques described herein relate to a system, wherein the each of the plurality of lighting fixtures further includes sensor circuitry equipped with an ambient light sensor and an occupancy sensor.

In some aspects, the techniques described herein relate to a system, wherein the memory includes further instructions, which, when executed by the processing circuitry cause the plurality of lighting fixtures to: receive updated dynamic lighting simulation instructions via the sensor circuitry, wherein the sensor circuitry is configured to acquire the light output characteristics from the each of the plurality of lighting fixtures; and adjust dynamically, the light output characteristics from the light source over the time series, in dependence on the sensor circuitry.

In some aspects, the techniques described herein relate to a system, wherein the light source includes one or more light emitting diodes (LEDs).

In some aspects, the techniques described herein relate to a computer implemented method for dynamically controlling light to simulate an environment, including: providing one or more light fixtures, each with a light source, processing circuitry, communications circuitry, sensor circuitry, and driver circuitry; receiving, by the one or more light fixtures, instructions for dynamically transitioning light output characteristics provided by the light source on the one or more light fixtures based on general illumination parameters and simulated environment illumination parameters; and dynamically adjusting, by the one or more light fixtures, light output characteristics provided by the light source of the one or more lighting fixtures, wherein dynamically adjusting the light output characteristics maintains the general illumination parameters and adjusts the simulated environment illumination parameters over a time series.

In some aspects, the techniques described herein relate to a method, wherein the general illumination parameters include hue, saturation, brightness, color, color temperature, and color rendering index.

In some aspects, the techniques described herein relate to a method, wherein the simulated environment illumination parameters include hue, saturation, brightness, color, color temperature, and color rendering index, all of which are variable over the time series.

In some aspects, the techniques described herein relate to a method, further including receiving by the sensor circuitry, on the one or more light fixtures, the light output characteristics from the light output of the light source on the one or more light fixtures, and dynamically adjusting the light output characteristics based on input from the sensor circuitry transmitting instructions to the processing circuitry to maintain the general illumination parameters and the simulated environment illumination parameters via the driver circuitry.

In some aspects, the techniques described herein relate to a method, wherein the sensor circuitry includes an ambient light sensor, an occupancy sensor, one or more image sensors, and a temperature sensor.

In some aspects, the techniques described herein relate to a method, further including providing at least one of a sound, a temperature change, or air circulation from another device based on the instructions for dynamically adjusting, by the one or more light fixtures, the light output characteristics of the light provided by the light source of the one or more lighting fixtures.

In some aspects, the techniques described herein relate to a method, wherein the simulated environment illumination parameters are raw sensor data obtained via a network and provided as instructions to the processing circuitry.

In some aspects, the techniques described herein relate to a method, wherein the simulated environment illumination parameters include information from processed sensor data obtained via a network and provided as instructions to the processing circuitry.

In some aspects, the techniques described herein relate to a computer implemented method for dynamically controlling light, including: providing a light fixture with a light source, processing circuitry, communications circuitry, sensor circuitry, and driver circuitry; receiving, by the light fixture, instructions for dynamically transitioning light output characteristics from the light source based on general illumination parameters and simulated environment illumination parameters; maintaining, by the light fixture, the light output characteristics provided by the light source that maintains the general illumination parameters based on instructions received from the sensor circuitry; and dynamically adjusting, by the light fixture, the light output characteristics provided by the light source of the light fixture, wherein dynamically adjusting provides adjustment to the light output characteristics based on the simulated environment illumination parameters over a time series to reflect a simulated environment.

In some aspects, the techniques described herein relate to a method, wherein the simulated environment illumination parameters include information from processed sensor data obtained via a network and provided as instructions to the processing circuitry.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 5 illustrates dynamic lighting instructions according to one embodiment of the present disclosure.

FIGS. 12A-12E illustrate user interfaces for a user application according to one embodiment of the present disclosure.

FIGS. 13A and 13B illustrate creation of multiple lighting control profiles, which may be used by the intelligent lighting coordinator to provide dynamic lighting according to another embodiment of the present disclosure.

Figure 18:
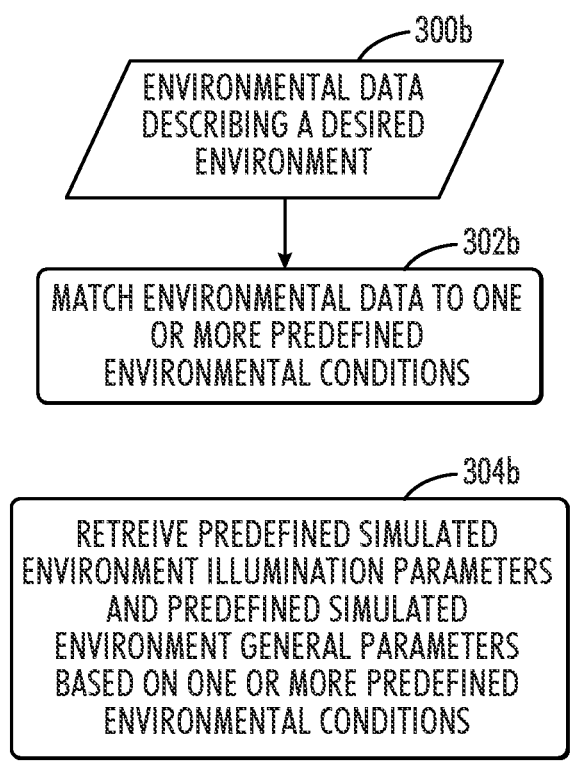

FIG. 18 a flow diagram illustrating a process of obtaining a set of simulated environment illumination parameters and simulated environment general parameters according to one embodiment of the present disclosure.

Figure 19:
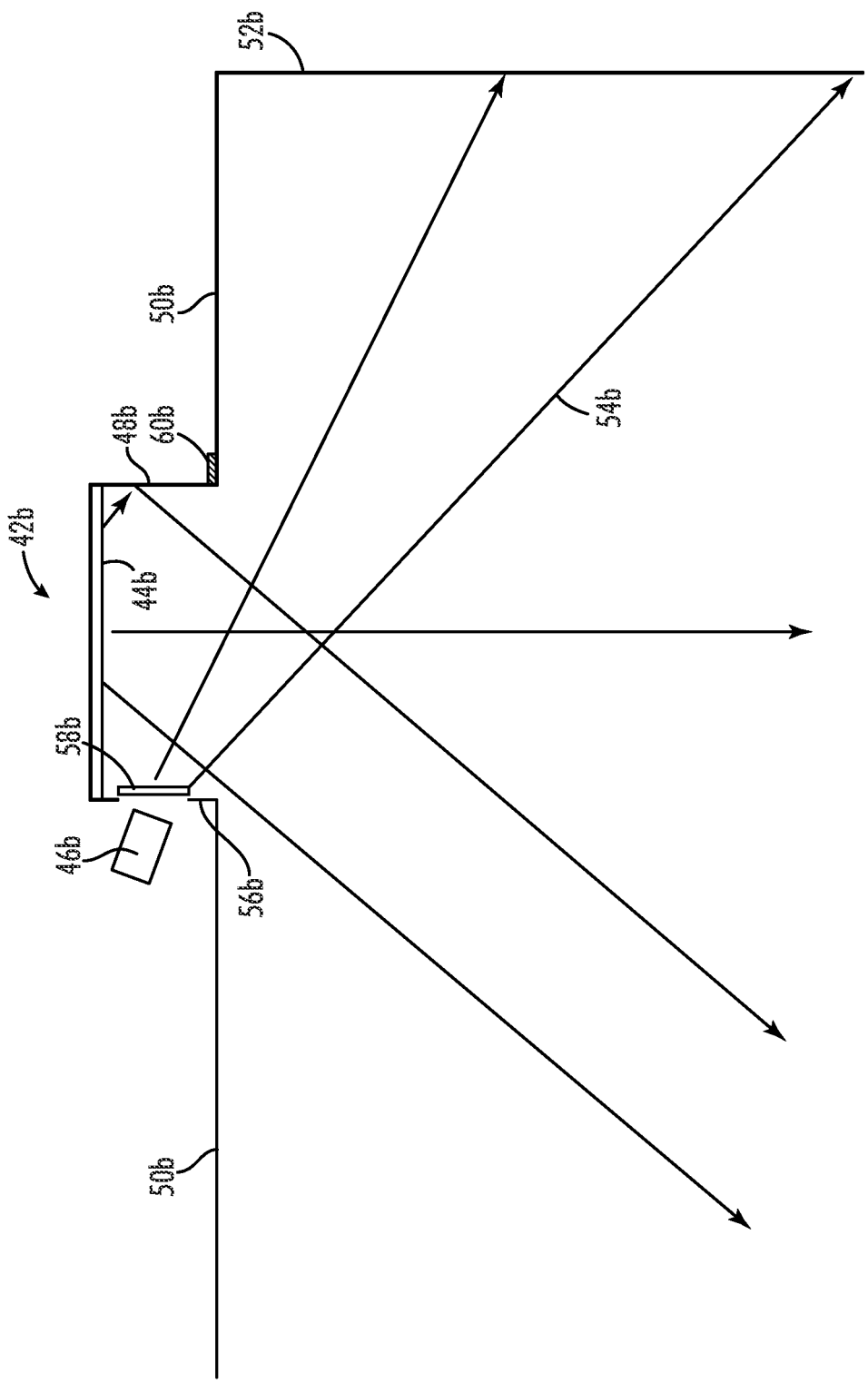

FIG. 19 is a diagram illustrating a lighting fixture according to one embodiment of the present disclosure.

Figure 20:
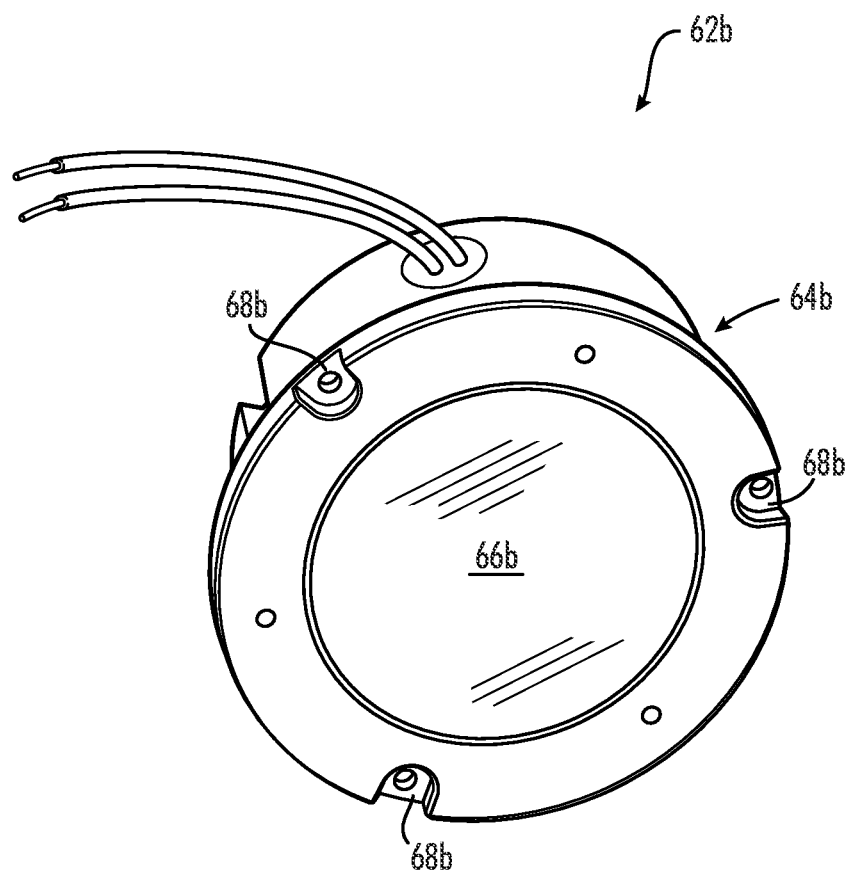

FIG. 20 is a diagram illustrating a lighting fixture according to one embodiment of the present disclosure.

Figure 21:
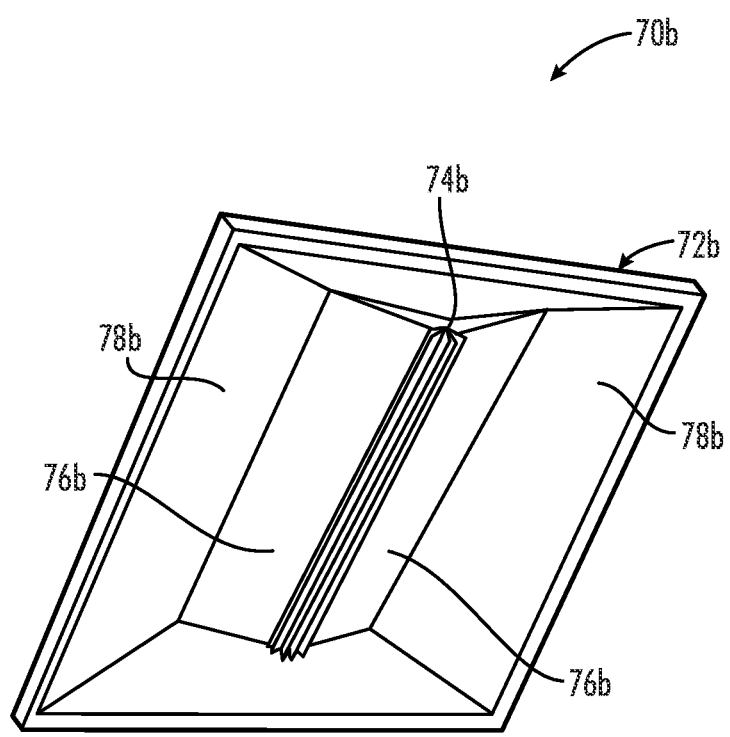

FIG. 21 is a diagram illustrating a lighting fixture according to one embodiment of the present disclosure.

FIGS. 22-25 include graphs and diagrams illustrating lighting parameters suitable for general illumination according to various embodiments of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As discussed above, it may be desirable to provide dynamic lighting in which one or more characteristics of light provided from a lighting device or a group of lighting devices changes over time to shape the environment of an indoor space. Dynamic lighting may improve the health or wellbeing of individuals in an indoor space, for example, by simulating an outdoor environment to reduce stress, by providing circadian entrainment to improve sleep and wakefulness, or the like. Conventionally, synchronization of the light output of multiple lighting devices has required significant overhead in the form of communications between lighting devices and one or more coordinator devices (i.e., lots of messages sent at very short intervals). Often, lighting devices form part of a low bandwidth mesh network in which available data throughput is relatively low. For this reason, and amongst others, conventional methods for synchronization of lighting devices may not be capable of providing a seamless dynamic lighting experience due to the fact that they will flood such a low bandwidth network and limited processing power, thus interrupting the synchronization of light output of lighting devices. Further, conventional methods for synchronizing the light output of lighting devices are not tolerant to dropped messages, since the lighting devices rely on messages from the one or more coordinator devices to change any aspect of the light output provided therefrom. Dropped messages may result in no changes in the light output from the lighting devices, and when a message finally does arrive at a lighting device may result in an abrupt change in light output that is disruptive to individuals in the space.

Alternatively, dynamic lighting has required a real time clock at each lighting device for accurate timekeeping and thus synchronization. Integrating a real time clock into a lighting device adds overhead in terms of both cost and complexity to the lighting device. Accordingly, it is often not practical to do so.

Aspects of the present disclosure enable lighting devices to provide light that is synchronized with one or more other devices and does not significantly drift over time so that the lighting devices can provide seamless dynamic lighting experiences that shape the environment of an indoor space.

Figure 1:
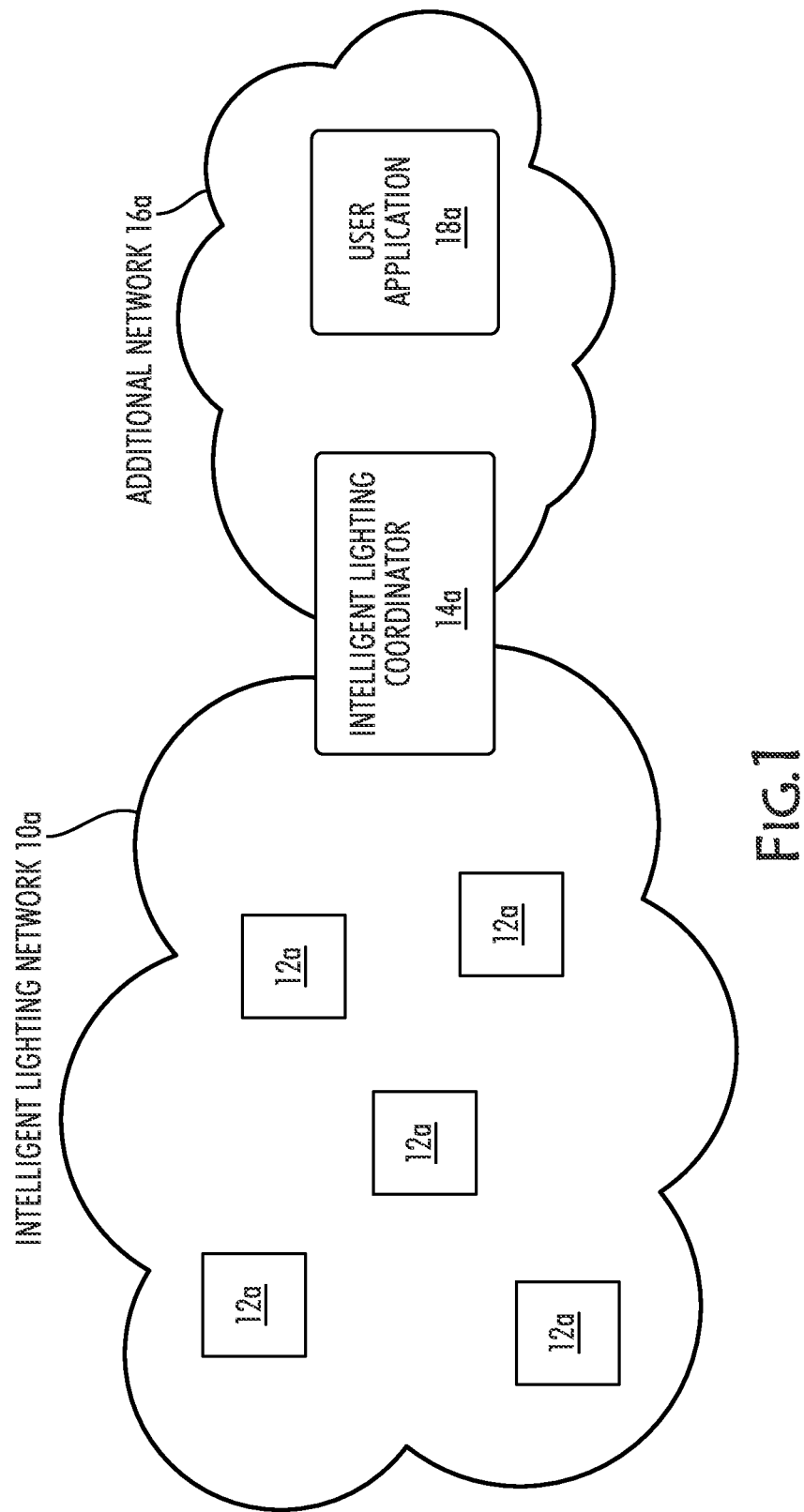
FIG. 1 illustrates an intelligent lighting network according to one embodiment of the present disclosure.

FIG. 1 shows a high-level overview of an intelligent lighting network 10a according to one embodiment of the present disclosure. The intelligent lighting network 10a includes one or more lighting devices 12a and an intelligent lighting coordinator 14a. The intelligent lighting network 10a may be a mesh network such as one based on the IEEE 802.15.4 standard. The intelligent lighting coordinator 14a may also be part of an additional network 16a such as a TCP/IP network (e.g., via Ethernet, Wi-Fi, or any other suitable connection mechanism). Accordingly, the intelligent lighting coordinator 14a may provide gateway functionality to bridge communication between the intelligent lighting network 10a and the additional network 16a. A user application 18a may connect to the intelligent lighting coordinator 14a via the additional network 16a in order to determine information about the one or more lighting devices 12a and/or control one or more aspects of the functionality of the one or more lighting devices 12a. The user application 18a may be a software application executing on non-transitory memory of a general purpose computing device such as a smartphone, a tablet, a computer, or the like.

Figure 2:
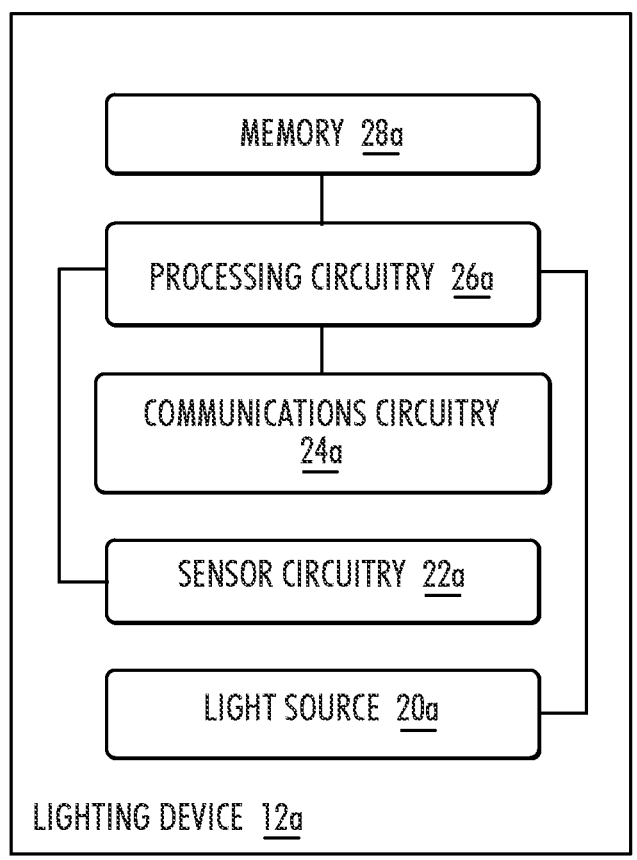
FIG. 2 illustrates a lighting device according to one embodiment of the present disclosure.

FIG. 2 illustrates details of a lighting device 12a in the intelligent lighting network 10a according to one embodiment of the present disclosure. The lighting device 12a includes a light source 20a, sensor circuitry 22a including one or more sensors (e.g. ambient light sensor, motion sensor), communications circuitry 24a, processing circuitry 26a coupled to driver circuitry or directly to the light source 20a. Wherein, the sensor circuitry 22a, the driver circuitry, the communications circuitry 24a, and memory 28a are all coupled to the processing circuitry 26a. This coupling may be wire or wireless, and even through bus circuitry. The light source 20a may include any suitable type of light source for providing light for general illumination. For example, the light source 20a may include a number of light emitting diodes (LEDs), and combined the LEDs may produce light output characteristics.

In some embodiments, the processing circuitry 26a provides control signals for controlling the light source 20a according to one or more light output characteristics, while circuitry for providing signals suitable to drive the light source 20a in accordance with the control signals is integrated into the light source 20a itself. In other embodiments, drive signals may be provided directly by the processing circuitry 26a or may be provided by external circuitry such as driver circuitry, which is not shown. The sensor circuitry 22a may include any number of sensors such as an ambient light sensor, an occupancy sensor, one or more image sensors, a temperature sensor, or the like, and may provide sensor data from the one or more sensors to the processing circuitry 26a in order to enable certain functionality of the lighting device 12a discussed below. The communications circuitry 24a enables communication with other devices such as one or more other lighting devices 12a and the intelligent lighting coordinator 14a. The memory 28a stores instructions, which, when executed by the processing circuitry 26a cause the lighting device 12a to perform one or more functions, such as provide dynamic lighting as discussed in detail below.

In some embodiments, the lighting device 12a includes multiple light sources 20a, such as a direct light panel and an indirect light panel. In some embodiments, further light sources 20a may be included, such as a sky-emulating light source (e.g., where another light source may be a sun-emulating light source). In an exemplary aspect, the processing circuitry 26a provides control signals for controlling each of the light sources 20a independently according to one or more light output characteristics.

Figure 3:
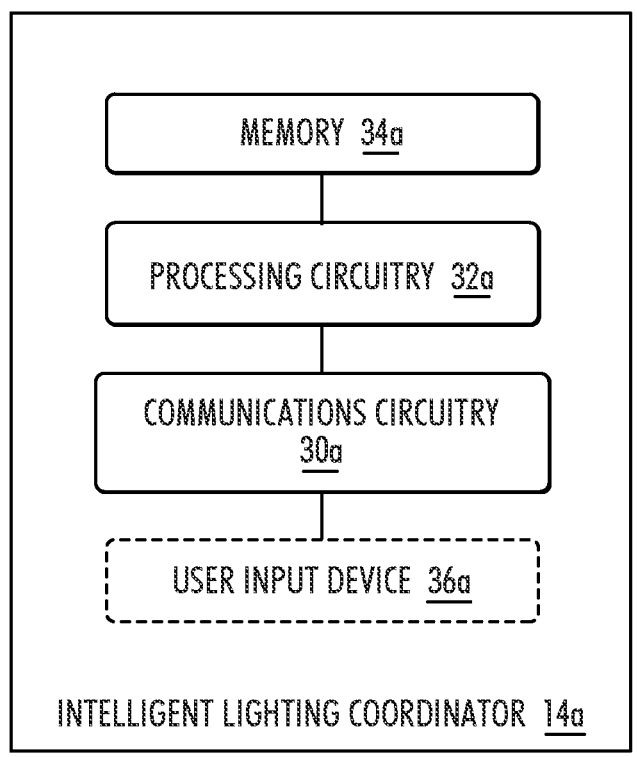
FIG. 3 illustrates an intelligent lighting coordinator according to one embodiment of the present disclosure.

FIG. 3 illustrates details of the intelligent lighting coordinator 14a according to one embodiment of the present disclosure. The intelligent lighting coordinator 14a includes communications circuitry 30a, processing circuitry 32a, a memory 34a, and optionally a user input device 36a. The communications circuitry 30a enables communication with other devices such as the one or more lighting devices 12a and the user application 18a. Accordingly, the communications circuitry 30a may have multiple communications interfaces such as a first type of communications interface to communicate with the one or more lighting fixtures 12a and a second type of communications interface to communicate with the user application 18a (e.g., via the user input device 36a, which may be a touch input display). The memory 34a stores instructions, which, when executed by the processing circuitry 32a cause the intelligent lighting coordinator 14a to perform one or more functions, such as coordinating dynamic lighting as discussed in detail below.

Figure 4:
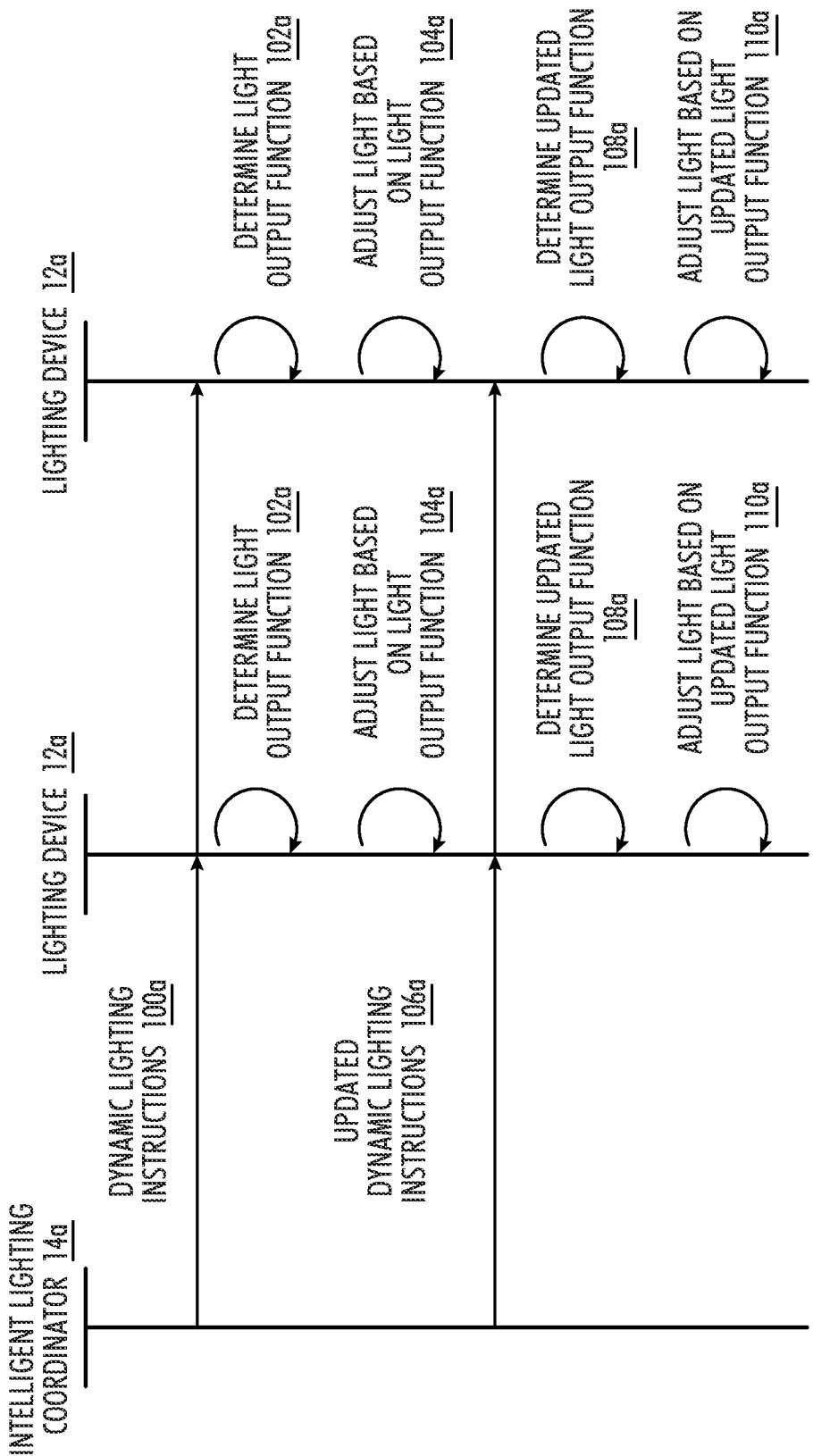
FIG. 4 illustrates interaction between an intelligent lighting coordinator and a lighting device to provide dynamic lighting according to one embodiment of the present disclosure.

FIG. 4 is a call flow diagram illustrating a method for providing dynamic lighting according to one embodiment of the present disclosure. As described below, the intelligent lighting coordinator 14a coordinates dynamic lighting from the one or more lighting devices 12a in such a way that communications bandwidth relating to the dynamic lighting is minimized. The lighting devices 12a operate semi-autonomously to provide dynamic lighting with minimal updates from the intelligent lighting coordinator 14a. First, dynamic lighting instructions are provided from the intelligent lighting coordinator 14a to one or more lighting devices 12a (block 100a). The dynamic lighting instructions include transition information for one or more light output characteristics of the light provided by each one of the lighting devices 12a. In some examples, the transition information includes a destination state of the one or more light output characteristics and a transition duration, where the transition duration specifies a duration of time over which a transition from a current state of the one or more light output characteristics to the destination state should occur. In other examples, the transition information includes the destination state and a transition end time (e.g., expressed as a relative time, an absolute time, a number of cycles of known duration, etc.). In still other examples, the transition information includes a light output function and may additionally include one or more of a transition duration, a destination state, or a transition end time.

Exemplary dynamic lighting instructions are shown in FIG. 5. As shown, the dynamic lighting instructions include a destination state for a correlated color temperature (CCT) in Kelvin (K), a destination state for a brightness in percentage, and a transition duration in minutes for each one of a first profile identifier, a second profile identifier, and a third profile identifier. The destination state indicates a desired value for the light output parameter (CCT and brightness in the present example; other examples may additionally or alternatively include sky emulation color, sun emulation position, modulation for communications, or the like). The transition duration indicates the amount of time over which a transition from a current state of the light output parameter to the destination state should occur. The profile identifier is used to specify which lighting device 12a or lighting devices 12a the destination states associated with the profile identifier are intended for. Each lighting device 12a may be associated with a profile identifier and thus may use only those destination states provided with the matching profile identifier in the dynamic lighting instructions. In one example, if a lighting device 12a is associated with the first profile identifier (FIG. 5 1001), a current state of the CCT of the light source 20a of the lighting device 12 is 3000 K, and a current state of the brightness of the light source 20a of the lighting device 12 is 40%, the dynamic lighting instructions indicate that the CCT of the light source 20a should transition from 3000 K to 5000 K and the brightness of the light source 20a should transition from 40% to 70% over the course of a time series of 60 minutes.

In some embodiments, the different profile identifiers are used to differentiate lighting devices 12a at different spatial locations within a space. For example, lighting devices 12a associated with the first profile identifier may be located at a first end of a space, lighting devices 12a associated with the second profile identifier may be located at a middle of the space, and lighting devices 12a associated with the third profile identifier may be located at a second end of the space opposite the first end. The destination states associated with each profile identifier may be configured to provide dynamic lighting that is coordinated across the space (e.g., light appears to move from the first end of the space to the second end of the space) over time. In embodiments discussed below, the dynamic lighting instructions are generated automatically based on knowledge of a spatial relationship between lighting devices 12a to provide such an effect. In some embodiments, different profile identifiers may additionally or alternatively be used to differentiate between light sources 20a within a same lighting device 12a (e.g., to differentiate an indirect/up light from a direct/downlight).

Notably, the dynamic lighting instructions shown in FIG. 5 are merely exemplary and provided for purposes of discussion. The dynamic lighting instructions may include more or less information according to various embodiments of the present disclosure. For example, the dynamic lighting instructions may include a destination state for directionality of light provided from a lighting device 12a for lighting devices 12a that are capable of adjusting a directionality of light provided therefrom. Exemplary lighting devices 12a capable of providing light having adjustable directionality are discussed at length in U.S. Pat. No. 10,781,984 titled "Skylight Fixture," the contents of which are hereby incorporated by reference in their entirety.

In response to receiving the dynamic lighting instructions, each lighting device 12a determines a light output function for changing from the current state of each light output characteristic based on the transition information (block 102a). Details regarding determination of the light output function are discussed below. Each lighting device 12a then adjusts one or more light output characteristic variables over time based on the light output function such that the light output characteristics transition from the current state based on the light output function (block 104a).

The light output characteristic variables are used, in a first mode (e.g., normal mode) of the lighting devices 12a, to adjust the one or more light output characteristics of each light source 20a. In some modes of the lighting devices 12a (e.g., based on occupancy events, due to an override instruction, in an emergency, etc.), the light output characteristic variables are not used to adjust the light output characteristics. However, in such modes, the light output characteristic variables may continue to be calculated based on the light output functions and are stored in the memory for when the first mode resumes.

Notably, each one of the lighting devices 12a continues to adjust the light output characteristic variables based on the determined light output function after the dynamic lighting instructions are received such that the lighting devices 12a operate semi-autonomously to transition between the current state and the destination state. However, as discussed above, the lighting devices 12a may not have access to a real time clock and thus may approximate a clock by counting processor clock cycles. Accordingly, the lighting devices 12a may experience timing drift such that they become unsynchronized with one or more other lighting devices 12a.

To keep the light output from the lighting devices 12a synchronized, at some update interval the intelligent lighting coordinator 14a sends updated dynamic lighting instructions to the lighting devices 12a (block 106a). The updated dynamic lighting instructions include updated transition information, such as an updated destination state (which may or may not change from the original dynamic lighting instructions) and an updated transition duration (or transition end time). The updated transition duration may be equal to the last transition duration sent minus the amount of time that has passed since the last dynamic lighting instructions were sent. For example, in a first set of updated dynamic lighting instructions sent five minutes after the original dynamic lighting instructions, the transition duration or time series for the first profile identifier may be 55 minutes (60 minutes-5 minutes). In other examples, synchronization may be provided in another manner, such as through periodic transmission of a clock synchronization signal.

In response to receiving the updated dynamic lighting instructions, each lighting device 12a determines an updated light output function for each light output parameter based on the updated transition information (block 108a). Each lighting device 12a then adjusts the one or more light output characteristic variables over time based on the updated light output function such that the light output characteristics transition from the current state based on the updated light output function (e.g., to the updated destination state over the updated transition duration) (block 110a).

By updating the light output function (e.g., slope) each time updated dynamic lighting instructions are received and adjusting light output characteristics based on the updated light output function (e.g., an updated calculated slope between the current state and the destination state), the lighting devices 12a are able to provide transitions between different light output characteristics with minimal updates from the intelligent lighting coordinator 14a while simultaneously avoiding abrupt changes in light output characteristics. If a lighting device 12a experiences some timing drift between updated dynamic lighting instructions, the updated light output function may be different from the light output function determined in response to the previously received dynamic lighting instructions. The lighting device 12a will not attempt to adjust the light output characteristics back to the previously determined function, which may result in an abrupt change in the light output characteristics that would be disruptive to individuals in the space. Instead, the updated light output function is used to adjust the light output characteristics as discussed above.

In some embodiments, the dynamic lighting instructions may be used to adjust other settings for operating the lighting device 12a in addition to adjusting the light output characteristics (block 104a, block 110a). For example, operation of the sensor circuitry 22a may be adjusted (e.g., to activate, deactivate, adjust sensitivity, etc.), or other settings used for controlling the light sources (e.g., occupancy level, daylight settings, scheduled operations, etc.) may be adjusted.

Figure 6:
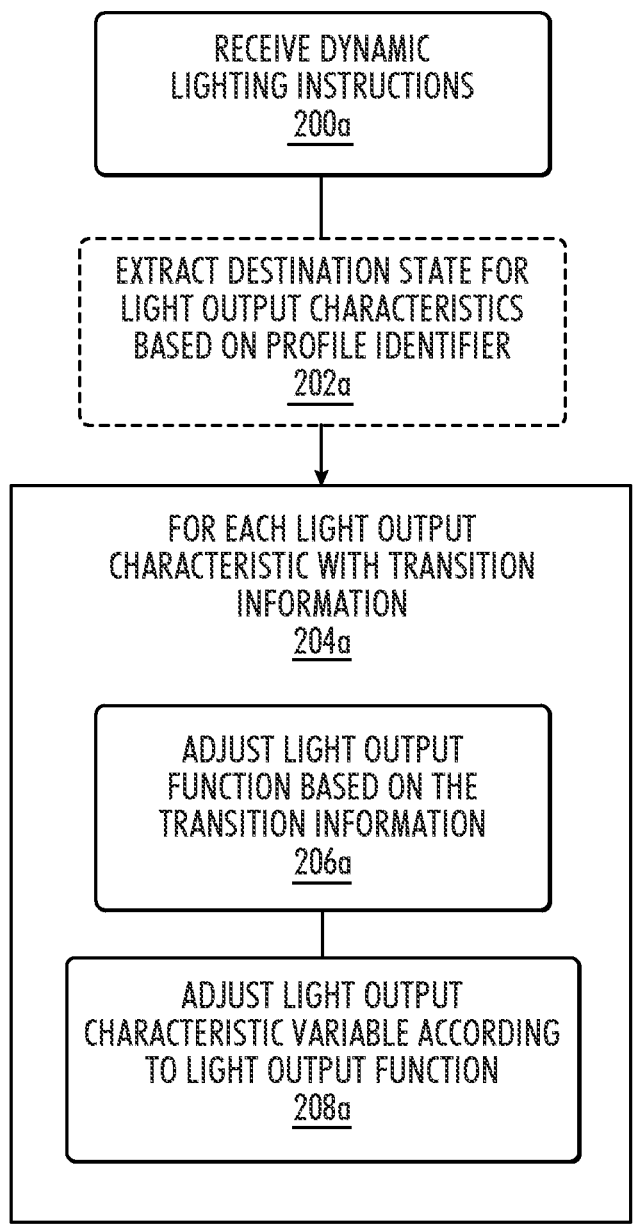
FIG. 6 illustrates a method for providing dynamic lighting from a lighting device according to one embodiment of the present disclosure.

FIG. 6 is a flow diagram illustrating a method for providing dynamic lighting from the lighting device 12a according to one embodiment of the present disclosure. First, dynamic lighting instructions are received at the lighting device 12a (block 200a). The dynamic lighting instructions may be similar to those discussed above with respect to FIG. 5. Accordingly, the dynamic lighting instructions may include transition information (e.g., a destination state, a transition duration, a transition end time, a light output function) for one or more light output characteristics of the light source 20a of the lighting device 12a. For example, the dynamic lighting instructions may include a destination state or light output function for CCT and brightness.

As discussed above, the dynamic lighting instructions may include a destination state or light output function for one or more light output characteristics for the lighting devices 12a having different profile identifiers. Accordingly, a destination state for one or more light output characteristics is optionally extracted from the dynamic lighting instructions based on a profile identifier associated with the lighting device 12a (block 202a). For example, if the lighting device 12a is associated with the first profile identifier (FIG. 5 1001), the destination states for CCT and brightness associated with the first profile identifier may be extracted from the dynamic lighting instructions for calculation of the light output function discussed below.

For each one of the light output characteristics having transition information (block 204a), a light output function is calculated based on the transition information (e.g., a slope between the current state of the light output characteristic and the destination state) for the light output characteristic (block 206a). For example, if the light output characteristics include CCT and brightness, a slope between the current CCT and the destination CCT will be calculated and a slope between the current brightness and the destination brightness will be calculated. The one or more light output characteristics are then adjusted according to the slope calculated for each light output characteristic (block 208a) such that the one or more light output characteristic variables (e.g., and the light output characteristics themselves) transition from the current state to the destination state over the transition duration. It should be understood that the light output function is not limited to a slope, but may also be any appropriate function for adjusting the light output characteristics over time, such as a geometric function, a circadian function, and so on. The memory 28a of the lighting device 12a may store instructions, which, when executed by the processing circuitry 26a cause the lighting device 12a to provide the functionality discussed above.

Figure 7:
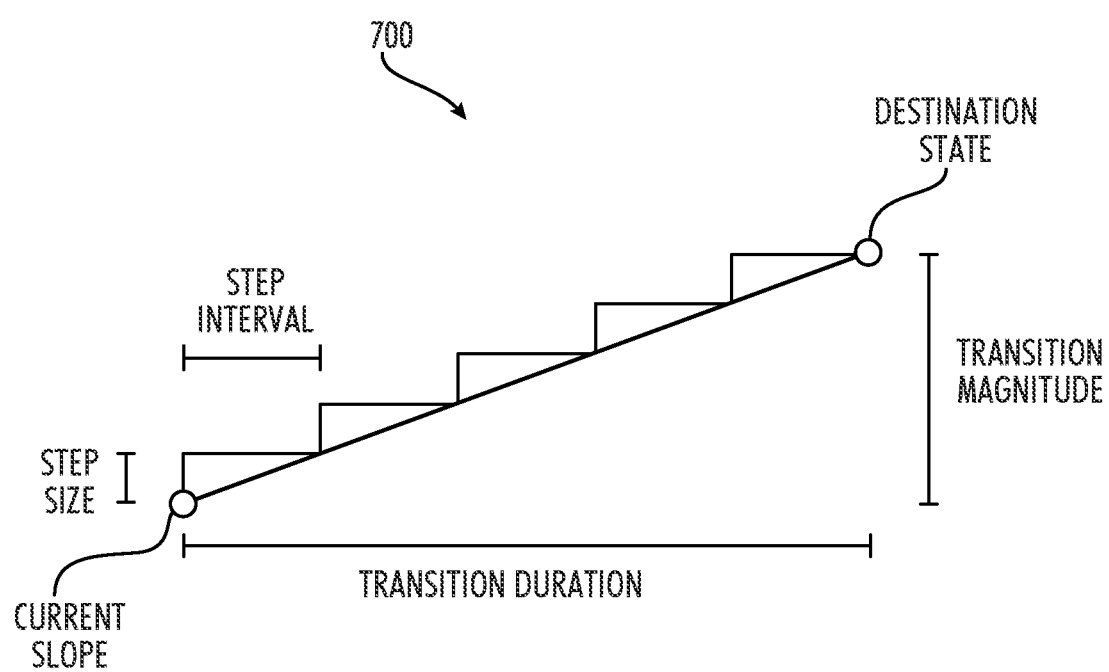
FIG. 7 illustrates details of calculating a slope between a current state of a light output characteristic and a destination state according to one embodiment of the present disclosure.

FIG. 7 illustrates an example of determining a light output function by calculating a slope between a current state of a light output characteristic and a destination state of the light output characteristic. To calculate the slope, a transition magnitude is calculated as the difference between the current state and the destination state. Using the dynamic lighting instructions shown in FIG. 5 as an example and referring back to the example wherein the lighting device 12a is associated with the first profile identifier (1001), and a current state of the CCT of the light source 20a of the lighting device 12a is 3000 K, the transition magnitude is 2000 K (5000 K destination state as specified in the dynamic lighting instructions−3000 K current state=2000 K). The transition duration is 60 minutes as specified in the dynamic lighting instructions. The slope is thus the transition magnitude over the transition duration, time series, which in the present example is 2000 K/60 min or 33.33 K/min.

The light source 20a of the lighting device 12a may be limited in the resolution available for adjusting a given light output characteristic, as determined by a minimum step size representing the minimum amount by which a light output characteristic can be changed. This is dictated by the light source 20a itself as well as the circuitry that drives the light source 20. Due to the limits on the adjustability of the light output characteristics of the light source 20, a number of steps between the current state and the destination state may be calculated by dividing the transition magnitude by the step size. In the example shown, the step size is 400 K, thereby providing 5 steps between the current state and the destination state (2000 K/400 K=5). A step interval is then calculated by dividing the transition duration by the number of steps (60 min/5=12 min). The step interval is the interval between which the light output characteristic (in the present example CCT) should be changed by the minimum step size in the direction of the destination state. With the step interval calculated, the lighting device 12a now knows that it should change the CCT by the minimum step size (400 K) every 12 minutes to arrive at the destination state of 5000 K in 60 minutes across the time series.

Figure 8:
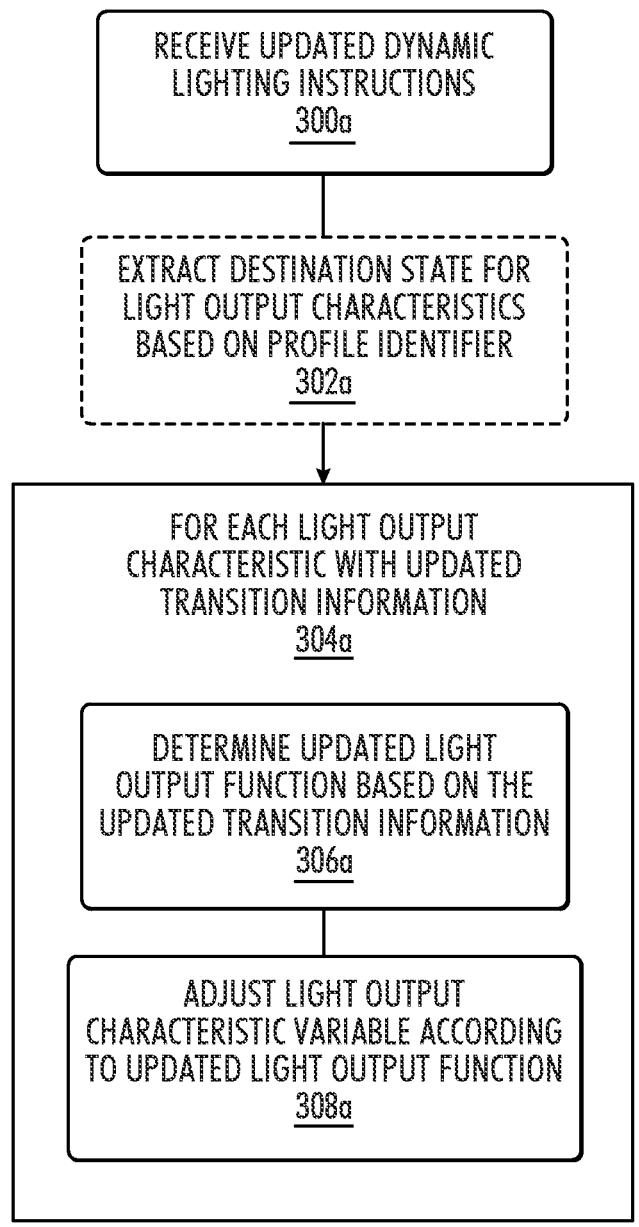
FIG. 8 illustrates a method for providing dynamic lighting from a lighting device according to one embodiment of the present disclosure.

FIG. 8 is a flow diagram illustrating further details of the method for providing dynamic lighting from the lighting device 12a shown in FIG. 6 according to one embodiment of the present disclosure. First, updated dynamic lighting instructions are received at the lighting device 12a (block 300a). The updated dynamic lighting instructions include updated transition information (e.g., an updated destination state and/or updated light output function) for one or more light output characteristics of the light source 20a of the lighting device 12a and an updated transition duration (or updated transition end time). A destination state (and/or other transition information) for one or more light output characteristics is optionally extracted from the dynamic lighting instructions based on a profile identifier associated with the lighting device 12a (block 302a).

For each one of the light output characteristics having updated transition information (block 304a), an updated light output function is determined (e.g., an updated slope is calculated between the current state and the updated destination state) for the light output characteristic (block 306a). The one or more light output characteristic variables are then adjusted according to the slope calculated for each light output characteristic (block 308a) such that the one or more light output characteristics transition from the current state to the destination state over the transition duration. The memory 28a of the lighting device 12a may store instructions, which, when executed by the processing circuitry 26a cause the lighting device 12a to provide the functionality discussed above.

Figure 9:
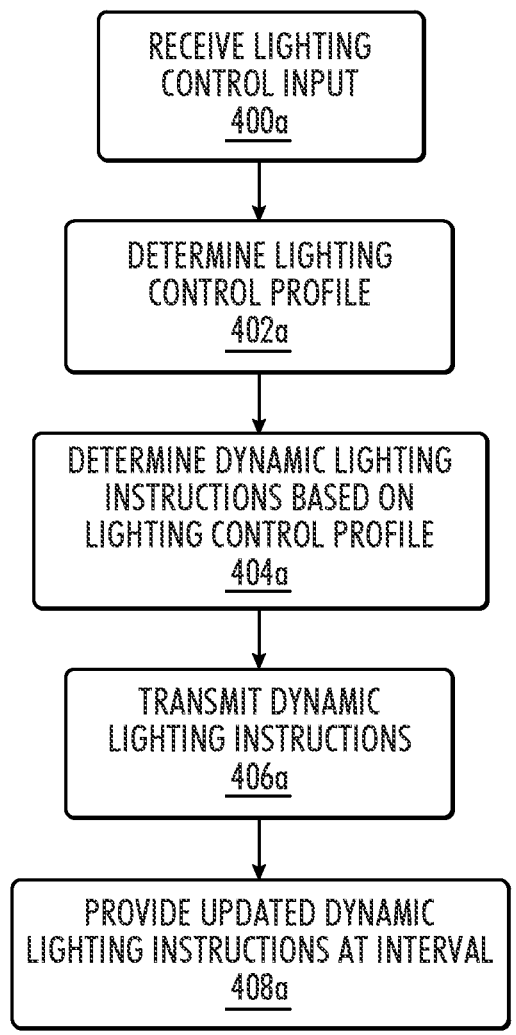
FIG. 9 illustrates a method for coordinating dynamic lighting from an intelligent lighting coordinator according to one embodiment of the present disclosure.

FIG. 9 is a flow diagram illustrating a method for providing dynamic lighting instructions from the intelligent lighting coordinator 14a according to one embodiment of the present disclosure. First, a lighting control input is received via the communications circuitry 30a (e.g., from the user input device 36a) (block 400a). A lighting control profile is determined from the lighting control input (block 402a). The lighting control profile is used for dynamically adjusting one or more lighting characteristics associated with one or a plurality of light sources 20a. The lighting control input may therefore correspond to user creation or adjustment of one or more lighting control profiles (e.g., adjusting start time, end time, duration, destination state, etc. of a lighting transition).

Dynamic lighting instructions are determined by the intelligent lighting coordinator 14a based on the lighting control profile (block 404a). The dynamic lighting instructions may be similar to those discussed with respect to FIG. 5 above. Determining the dynamic lighting instructions may involve translating graphical interface-based inputs into lighting characteristics to be adjusted, as well as the manner of their adjustment such that communications bandwidth relating to the dynamic lighting is minimized. The intelligent lighting coordinator 14a transmits the dynamic lighting instructions to one or more lighting devices 12a (block 406a).

Optionally, at some interval, updated dynamic lighting instructions may be provided (block 408a). The interval may be determined by a timing drift associated with the lighting devices 12a. For example, a measurable timing drift of the lighting devices 12a may result in noticeable differences between adjacent lighting devices 12a over some period of time if the updated dynamic lighting instructions are not provided. This period of time may be used to determine the interval used to send updated dynamic lighting instructions. The memory 34a of the intelligent lighting coordinator 14a may store instructions, which, when executed by the processing circuitry 32a cause the intelligent lighting coordinator 14a to provide the functionality discussed above.

By only sending updated dynamic lighting instructions at certain intervals and operating the lighting devices 12a in a semi-autonomous manner such that a slope between a current state and a destination state is calculated for each set of dynamic lighting instructions received as discussed above, the lighting devices 12a can remain synchronized when providing dynamic lighting with minimal overhead in terms of communication between the lighting devices 12a and the intelligent lighting coordinator 14a. Further, abrupt changes in the light output of the lighting devices 12a are avoided to provide a pleasant and seamless dynamic lighting experience.

In an exemplary aspect, the lighting devices 12a operate in multiple modes. In a first mode, which may be considered a normal mode, a lighting device 12a operates as described above, with dynamic lighting provided according to dynamic lighting instructions received from the intelligent lighting coordinator 14a. The lighting device 12a may operate in a second mode in response to a triggering event (e.g., received from an occupancy sensor, a wall controller, a scene controller, an emergency system, etc.) in which the lighting device may not provide all functions of the normal mode. For example, the second mode may be an override mode in which one or more of the light output functions derived from the dynamic lighting functions are overridden. While the light output functions are overridden, the adjustment of the light output characteristic variables may terminate, may be paused, or may continue such that the dynamic lighting resumes when the lighting device 12a exits the override mode.

In an example, the first mode may correspond to an occupancy state determined from occupancy sensor data (e.g., from an occupancy sensor in the lighting device 12a or received from another device). The second mode may correspond to an unoccupied state such that the light source is off, outputs at a low brightness, or otherwise is not adjusted in accordance with the dynamic functions described above. However, some of the light output characteristics may continue to be dynamically adjusted, such as the CCT. An example is further illustrated below.

Figure 10:
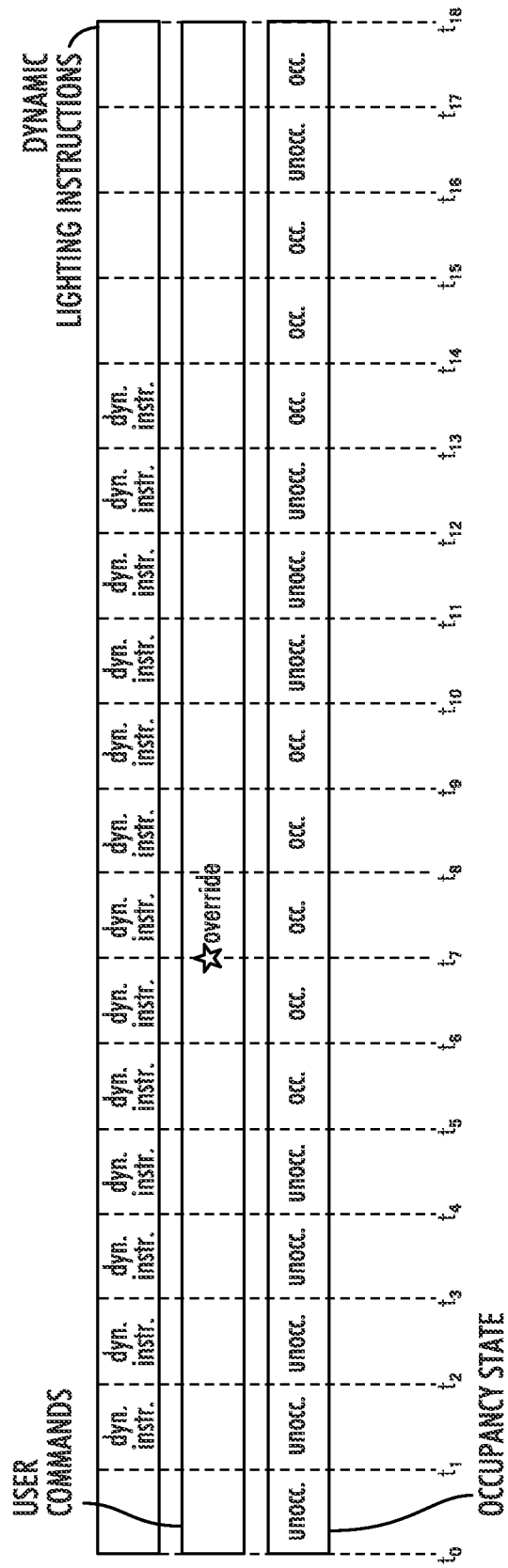
FIG. 10 illustrates a dynamic lighting program according to one embodiment of the present disclosure.

FIG. 10 is a diagram illustrating a dynamic lighting program according to one embodiment of the present disclosure. A first line illustrates dynamic lighting instructions provided to the lighting device 12a. A second line illustrates user commands (e.g., from the user application 18a, the user input device 36a, a wall controller, etc.) provided to the lighting device 12a. A third line illustrates an occupancy state, which may be detected by the sensor circuitry 22a of the lighting device 12a. As discussed below, the light output from the lighting device 12a is influenced by the dynamic lighting instructions, the user commands, and the occupancy state. The present example is discussed as it relates to a CCT and brightness of light provided from the light source 20 of the lighting device 12a. However, as discussed above, additional light output characteristics may be adjusted in a similar manner.

Between time $t_0$ and $t_1$, the occupancy state is unoccupied and no user commands or dynamic lighting instructions have been provided to the lighting device 12a. Accordingly, a CCT and brightness of light from the light source 20a are both provided at an unoccupied level (e.g., according to a second mode), which is a predetermined level for the CCT and brightness. At time $t_1$, dynamic lighting instructions are provided to the lighting device 12a. In response to the dynamic lighting instructions and as discussed above, the lighting device 12a determines a light output function (e.g., calculates a slope between the current state and a desired state). In the present example, a slope between a current state of the CCT and the desired state of the CCT and a slope between a current state of the brightness and the desired state of the brightness is calculated. However, since the occupancy state is unoccupied, only the CCT is adjusted according to the slope calculated for the CCT while the brightness of the lighting device 12a is kept at the unoccupied level to save power.

Notably, this is merely one example of how the lighting device 12a can behave, and in some embodiments both the CCT and brightness of the lighting device 12a may be adjusted according to the slope calculated for each one of these characteristics even when the occupancy state is unoccupied (e.g., the light output characteristic variables may be stored but not output). Table 1 illustrates various ways that a lighting device 12a can respond to an occupancy state and other commands based on one embodiment of the present disclosure:

| User application configuration Dynamic | Lighting device configuration | | |
| --- | --- | --- | --- |
| lighting by control zone | Occupancy timeout | Mode = Auto ON | Mode = Manual ON |
| Enabled | <30 min | Auto ON to dynamic lighting level and CCT Dimmer (CCT) command is considered an | No auto ON Dimmer command is considered an override of dynamic lighting |

-continued

| User application configuration Dynamic lighting by control zone | Occupancy timeout | Lighting device configuration | |
|---|---|---|---|
| | | Mode = Auto ON | Mode = Manual ON |
| | | override of dynamic lighting Auto OFF to unoccupied level and CCT continues to track with dynamic lighting | Auto OFF to unoccupied level and CCT continues to track with dynamic lighting |
| | Disabled | Auto ON to dynamic lighting level and CCT Dimmer (CCT) command is considered an override of dynamic lighting No auto OFF - dynamic lighting continues or remains at last commanded level | No Auto ON Dimmer command is considered an override of dynamic lighting Dynamic lighting resume command enables dynamic lighting No auto OFF - dynamic lighting continues or remains at last commanded level |
| Disabled | <30 min | Default behavior for auto ON mode | Default behavior for manual ON mode |
| | Disabled | Auto ON to occupied level Remains in last commanded state | No auto ON Dimmer command sets the level and CCT Remains in last commanded state |

Between time $t_1$ and $t_6$, the lighting device 12a calculates an updated slope for the CCT and the brightness in response to receipt of dynamic lighting instructions, but only the CCT is adjusted according to the calculated slope for the CCT while the brightness remains at the unoccupied level. Notably, even if a particular light output characteristic is not being changed by the lighting device 12a (e.g., due to an unoccupied state or a manual command from a user), the lighting device 12a continues to receive dynamic lighting instructions and calculate an updated slope for the light output characteristic in the background. This allows the lighting device 12a to seamlessly resume the dynamic lighting program at a later time, if the conditions dictate that it should do so.

At time $t_5$, the occupancy state changes from unoccupied to occupied. In response, the brightness is adjusted according to the slope calculated for the brightness (e.g., according to a first mode). In one embodiment, the brightness is immediately adjusted based on the calculated slope for the brightness. In other embodiments, some transition between the unoccupied level and a level based on the calculated slope for the brightness is performed.

Between time $t_5$ and $t_7$, an updated slope for the CCT and the brightness are calculated in response to receipt of dynamic lighting instructions and the CCT and brightness are adjusted accordingly. At time $t_7$, an override command is received from a user, causing the lighting device 12a to enter an override mode. The override command may be provided, for example, from the user application 18a, a wall controller, or any other suitable means. The override command specifies a desired CCT and brightness. In response to the override command the lighting device 12a immediately adjusts the CCT and brightness of the light source 20a to the desired CCT and brightness. Between time $t_7$ and $t_{10}$, the lighting device 12a continues to calculate an updated slope for the CCT and brightness in response to receipt of dynamic lighting instructions. However, the light source 20a is not adjusted based on the calculated slope during the override mode. Instead, the light source 20a provides the light output characteristics according to the override command.

At time $t_{10}$, the occupancy state changes from occupied to unoccupied. This ends the override mode and causes the lighting device 12a to adjust the brightness to the unoccupied level and the CCT to a level specified by the last calculated slope for the CCT based on the last received dynamic lighting instructions. Between time $t_{10}$ and $t_{13}$, the lighting device 12a continues to calculate an updated slope for the CCT and brightness in response to receipt of dynamic lighting instructions. However, only the CCT is adjusted according to the calculated slope for the CCT while the brightness remains at the unoccupied level.

At time $t_{13}$ the occupancy state changes from unoccupied to occupied. In response, the brightness is adjusted according to the calculated slope for the brightness. Between time $t_{13}$ and $t_{15}$, updated slopes for the CCT and brightness are calculated in response to receipt of dynamic lighting instructions and the CCT and brightness are adjusted accordingly. At time $t_{15}$, dynamic lighting instructions are no longer received by the lighting device 12a. Accordingly, the CCT and brightness are maintained at the destination state of the last received dynamic lighting instructions. At time $t_{16}$, the occupancy state changes from occupied to unoccupied. In response, the brightness is adjusted to the unoccupied level while the CCT remains unchanged. At time $t_{17}$ the occupancy state changes from unoccupied to occupied. In response, the brightness is adjusted to the brightness value in the last occupied state (just before time $t_{16}$). The CCT and brightness remain the same until time $t_{18}$, at which time the present example ends.

As illustrated above, an occupancy state may change which light output characteristics are adjusted based on the calculated slope for each light output characteristic. When the dynamic lighting instructions include destination states for a plurality of light output characteristics, each one of the plurality of light output characteristics may be adjusted according to the appropriate calculated slope when the occupancy state is occupied and only a subset of the plurality of light output characteristics may be adjusted according to the appropriate calculated slope when the occupancy state is unoccupied. For example, as illustrated above both CCT and brightness may be adjusted according to the appropriate calculated slope when the occupancy state is occupied while only CCT may be adjusted according to the calculated slope for CCT when the occupancy state is unoccupied.

As discussed above, different profile identifiers in the dynamic lighting instructions may be used to differentiate lighting devices 12a at different spatial locations within a space, and thus the destination states for each profile identifier may be constructed to create a dynamic lighting program that is coordinated across a space. In one embodiment, the destination states for each profile identifier are automatically generated to create a dynamic lighting program that is coordinated across a space.

Figure 11:
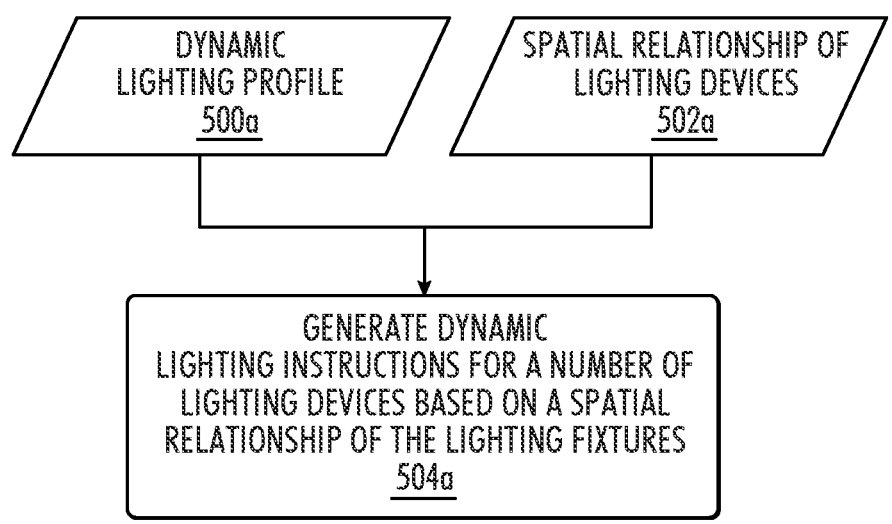
FIG. 11 illustrates a method for generating dynamic lighting instructions according to one embodiment of the present disclosure.

FIG. 11 is a flow diagram illustrating a method for generating dynamic lighting instructions to provide a dynamic lighting profile that is coordinated across a space. A dynamic lighting program (block 500a) and a spatial relationship of lighting devices 12a (block 502a) are received. The dynamic lighting program indicates a desired movement of light across a space over time. The spatial relationship of lighting devices 12a may include, for example, distances between the lighting devices 12a, absolute locations of the lighting devices 12a, relative locations of the lighting devices 12a, or the like. Dynamic lighting instructions are generated for the lighting devices 12a based on the spatial relationship of the lighting devices 12a and the dynamic lighting program (block 504a).

Generating the dynamic lighting instructions may include grouping lighting devices 12a into a number of profiles designated by a profile identifier based on their spatial relationships to one another, then generating destination states for each profile identifier to create a desired change in light across the space over time. In some embodiments, a lighting device 12a may have multiple profile identifiers (e.g., different profile identifiers for separate controls of different light sources 20a in the lighting device 12a), or a single profile identifier may be used to provide separate control of light sources 20a in the lighting device 12a. The profile identifiers may be fixed or configurable.

Figure 12A:
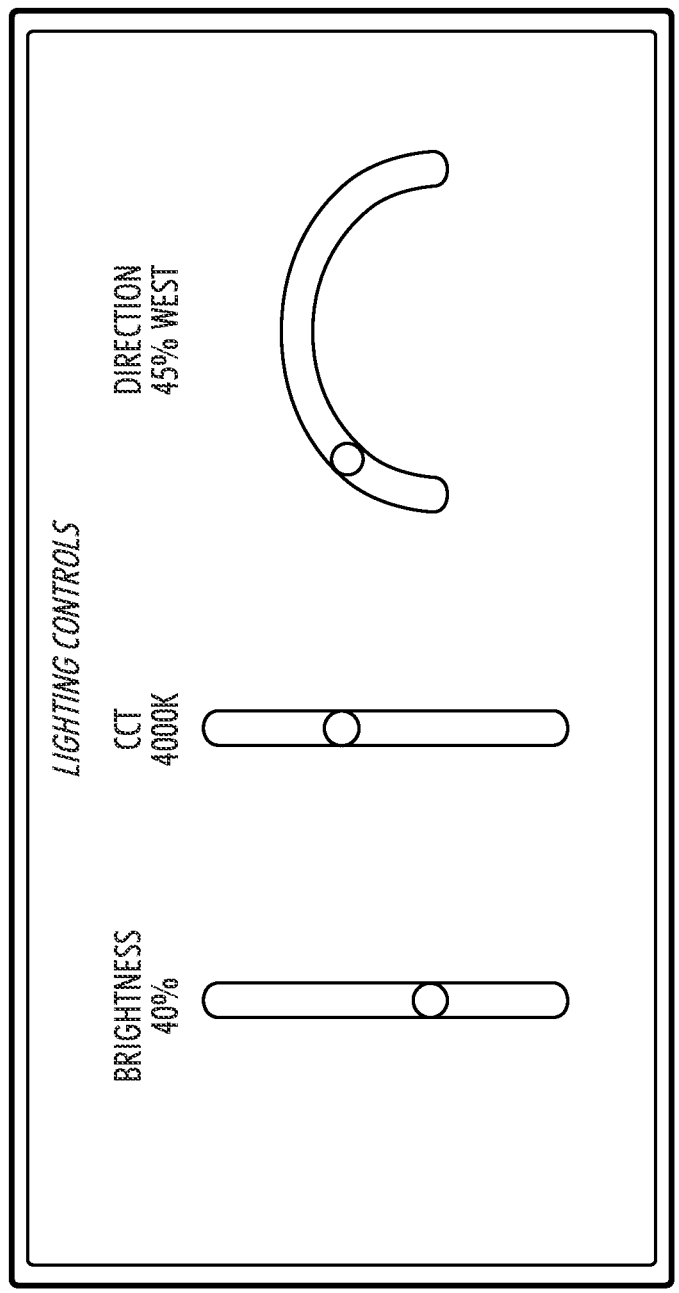
Figure 12B:
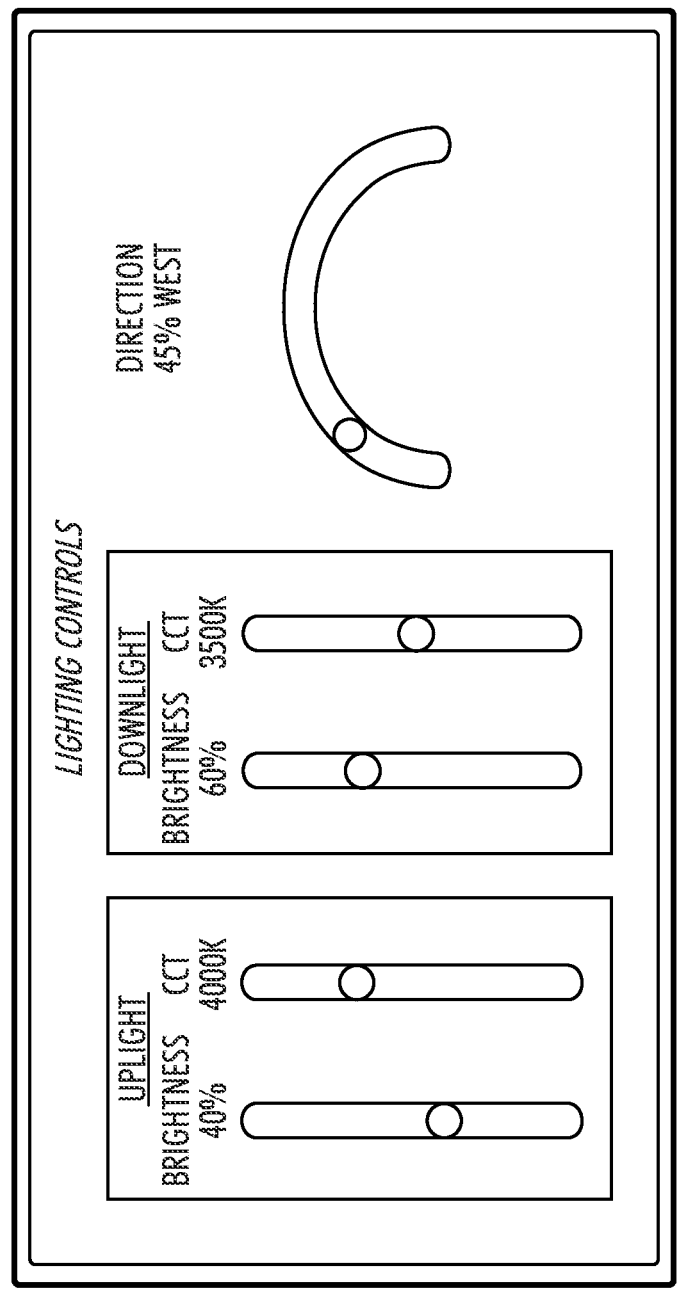

As discussed above, the user application 18a may be a software application running on a computing device such as a smartphone, a tablet, a computer, or the like. FIGS. 12A-12E illustrate exemplary user interfaces for the user application 18a according to various embodiments of the present disclosure. Specifically, FIG. 12A illustrates a first user interface for the user application 18a including controls for brightness, CCT, and directionality of light provided from one or more lighting devices 12. Notably, the user interface element for controlling the directionality of light is a slider that allows a user to change a directionality of light from a first direction to a second direction opposite the first direction. As discussed above, this user interface element may be useful for controlling the directionality of light from a skylight lighting fixture such as the one discussed above. FIG. 12B illustrates another user interface for the user application 18a that includes separate controls for different light sources 20 in one or more lighting devices 12a. In this example, separate control is provided for brightness and CCT of each of an up light (e.g., indirect light) and a downlight (e.g., direct light). The user interface further includes the slider that allows the user to change a directionality of light as in FIG. 12A. FIG. 12C illustrates another user interface for the user application 18 that includes separate controls for the different light sources 20a as in FIG. 12B. In this example, a group of lighting devices 12a may be selected (e.g., by profile identifier) and simplified controls for brightness adjustments are presented.

Figure 12D:
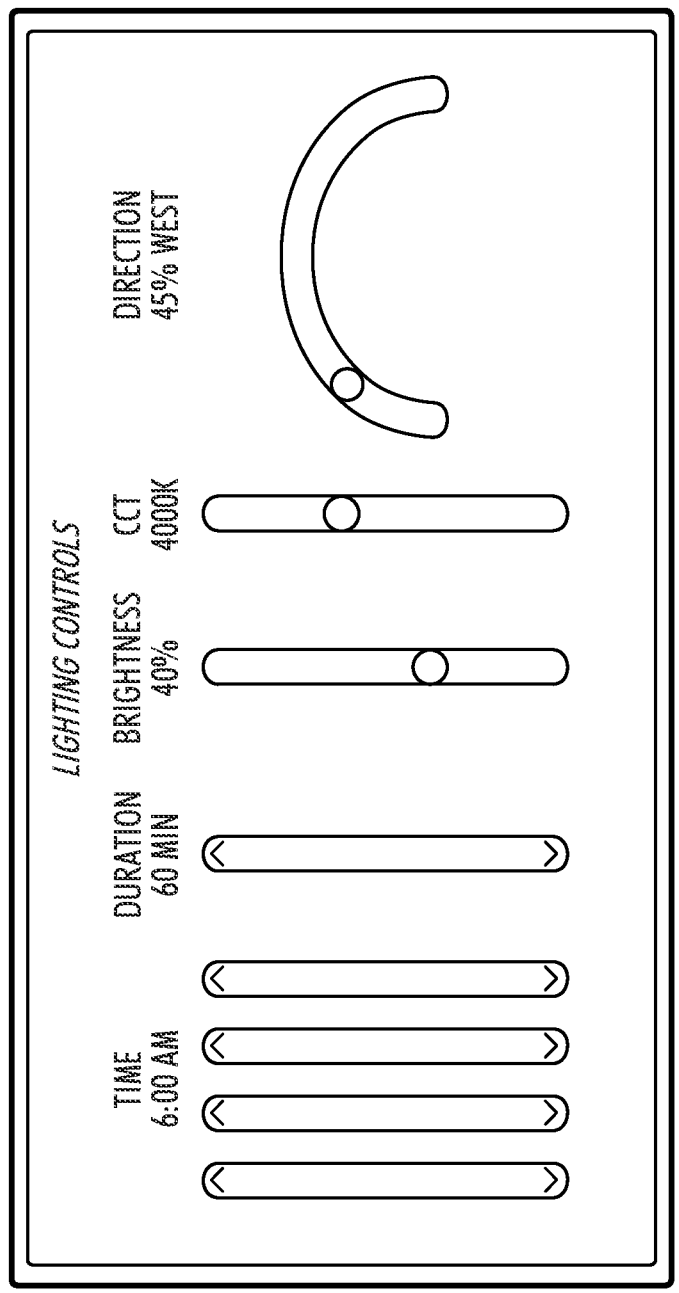
Figure 12E:
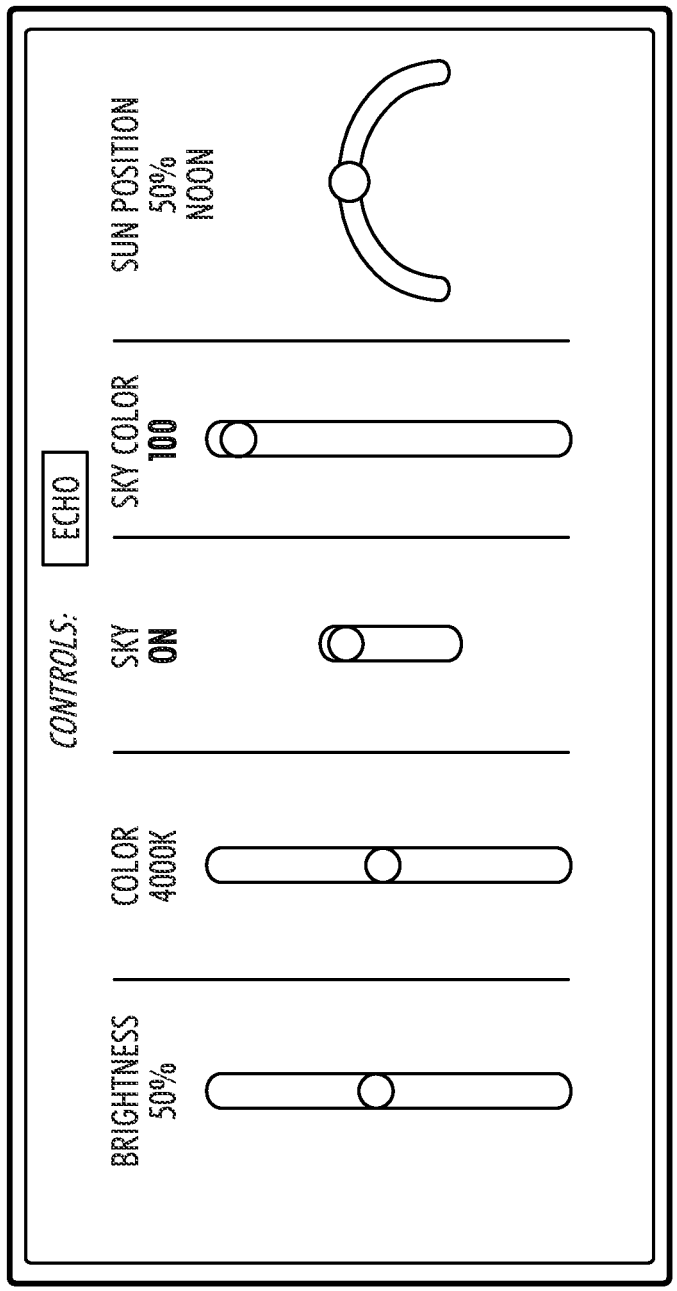

FIG. 12D illustrates a user interface for the user application 18a including controls for creating dynamic lighting instructions according to one embodiment of the present disclosure. The user interface includes controls for a start time, a duration, a brightness, CCT, and directionality of light. The start time determines what time the dynamic lighting instructions are sent to the lighting devices 12a for which the dynamic lighting instructions are intended. The duration indicates the transition duration, and the controls for brightness, CCT, and directionality indicate the destination states for these light output characteristics. By providing several of these inputs, a desired dynamic lighting program can be created. FIG. 12E illustrates another user interface for the user application 18a including controls for creating dynamic lighting instructions according to one embodiment of the present disclosure. The user interface includes controls for brightness, CCT, sky emulation state (on/off), sky emulation color, and directionality of light.

Figure 13B:
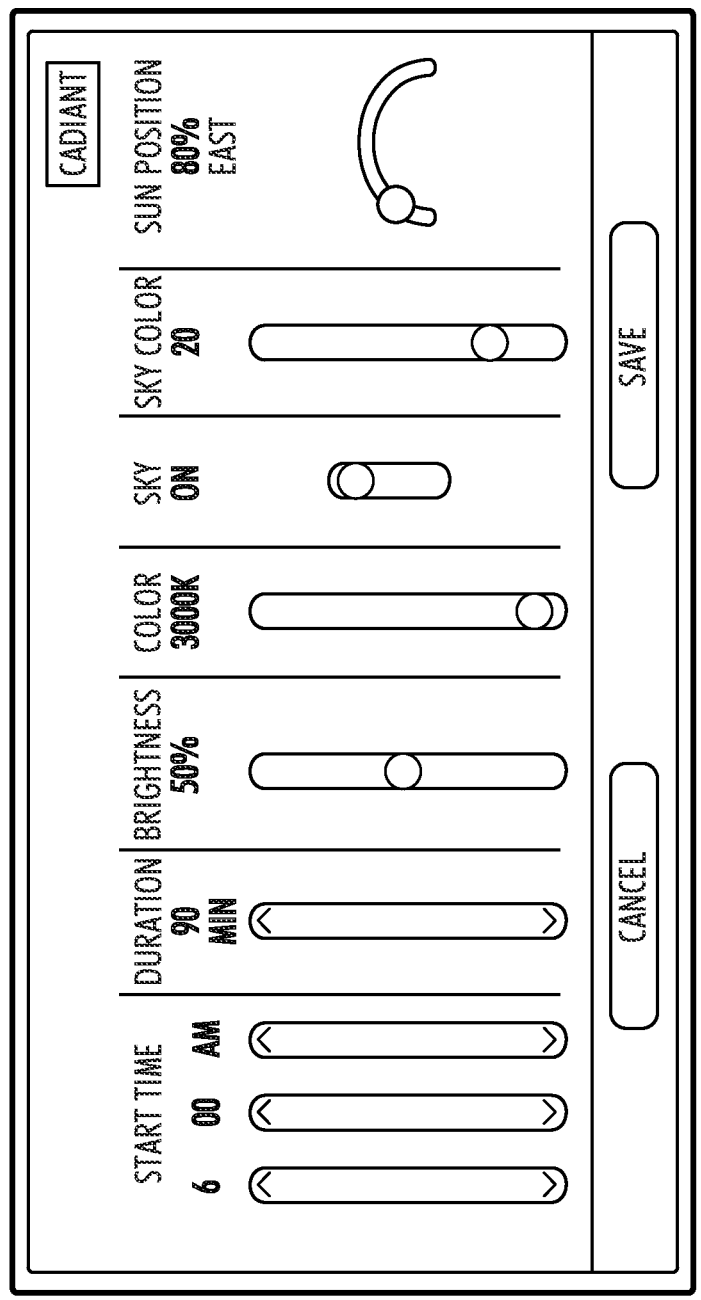

FIGS. 13A and 13B illustrate creation of multiple lighting control profiles, which may be used by the intelligent lighting coordinator 14a to provide dynamic lighting according to another embodiment of the present disclosure. In particular, FIG. 13A illustrates a user interface with a number of lighting control profiles for dynamically adjusting one or more lighting devices at different intervals. Each profile includes a start time, duration, brightness, CCT, sky emulation state, sky color, and directionality (e.g., sun position). As illustrated, a series of transitions are programed for adjusting one or more lighting devices 12a throughout each day. FIG. 13B illustrates a user interface for creating or adjusting one of the lighting control profiles of FIG. 13A. The user interface includes controls for a start time, a duration, a brightness, CCT, sky emulation state (on/off), sky emulation color, and directionality of light.

There is a growing body of research suggesting that time spent in natural outdoor environments provides several psychological benefits. While the particular characteristics of natural outdoor environments responsible for these benefits are elusive, it is clear that the indoor environments in which a large percentage of the population work do not include them. Conventionally, lighting and other environmental characteristics of indoor work environments are focused on meeting the minimum conditions suitable for worker productivity. With respect to lighting, this often means maintaining the light within the indoor space within a set of general illumination parameters. These general illumination parameters include, at the most basic level, a desired brightness level. With the advancement of light engines and their capability to more precisely control the light output therefrom, additional light quality characteristics such as color temperature and color rendering index have been included in these general illumination parameters. With respect to other environmental characteristics, this may include maintaining a noise level below a certain threshold, maintaining a temperature of the space within a desired range, or the like.

While previous generations of lighting fixtures and environmental control devices (e.g., thermostats, white noise generators, and the like) have been limited in their functionality and thus ability to create a specific indoor environment, recent advancements now provide an opportunity to not only provide a minimum threshold for enabling worker productivity, but to cultivate desired mental states and improve feelings of wellbeing.

Figure 14:
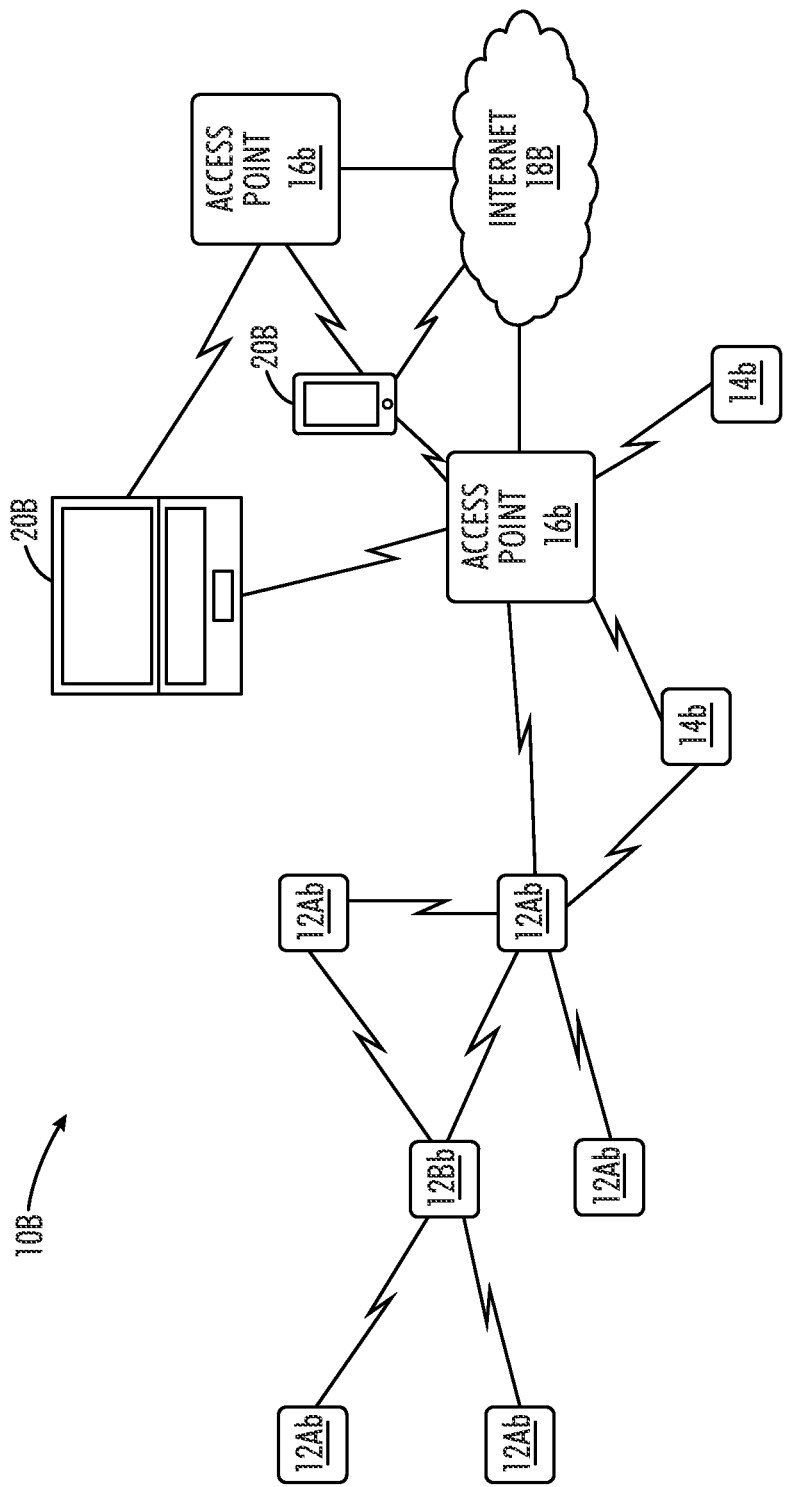
FIG. 14 is a block diagram illustrating a lighting network according to one embodiment of the present disclosure.

With specific reference to lighting, modern light engines including a number of light emitting diodes (LEDs) are capable of providing light having particular characteristics such as brightness, color, color temperature, color rendering index, and the like. Further, modern lighting fixtures may be networked such that they can communicate with one another and one or more other devices, as illustrated in FIG. 14. FIG. 14 shows an exemplary lighting network 10b, such as one created by Cree SmartCast™ lighting fixtures. The lighting network 10b may include lighting fixtures 12Ab, lighting controls 12Bb (e.g., switches, touch panel controllers, and the like), and other devices 14b (e.g., white noise controllers, speakers, thermostats, building management system control interfaces, and the like), all of which may communicate with one another via a wired or wireless connection (illustrated by the connections between the lighting fixtures 12Ab, the lighting controls 12Bb, and the other devices 14b). In one embodiment, the lighting fixtures 12Ab, the lighting controls 12Bb, and the other devices 14b form a mesh network; however, any suitable network topology may be used without departing from the principles of the present disclosure. One or more of the lighting fixtures 12Ab, the lighting controls 12Bb, and the other devices 14b may connect to an access point 16b in order to access a local area network (LAN) such as a local TCP/IP network or a wide area network (WAN) such as the Internet 18b. The access point 16b may enable the lighting fixtures 12Ab, the lighting controls 12Bb, and the other devices 14b to communicate with local and/or remote devices on the LAN or WAN, such as end-user devices 20b, which may include computers, mobile devices, and the like. Notably, these end-user devices 20b may connect to the lighting fixtures 12Ab, the lighting controls 12Bb, and the other devices 14 through the same access point 16b, in which case they may be on the same LAN, or through a different access point 16b or mobile communications network via a WAN such as the Internet 18b. One or more of the lighting fixtures 12Ab, the lighting controls 12Bb, and the other devices 14b may communicate with one another indirectly through the access point 16b. Further details regarding the lighting network 10b may be found in co-assigned and co-pending U.S. Patent Publication No. 2017/0230364A1, the contents of which are hereby incorporated by reference in their entirety.

Figure 15:
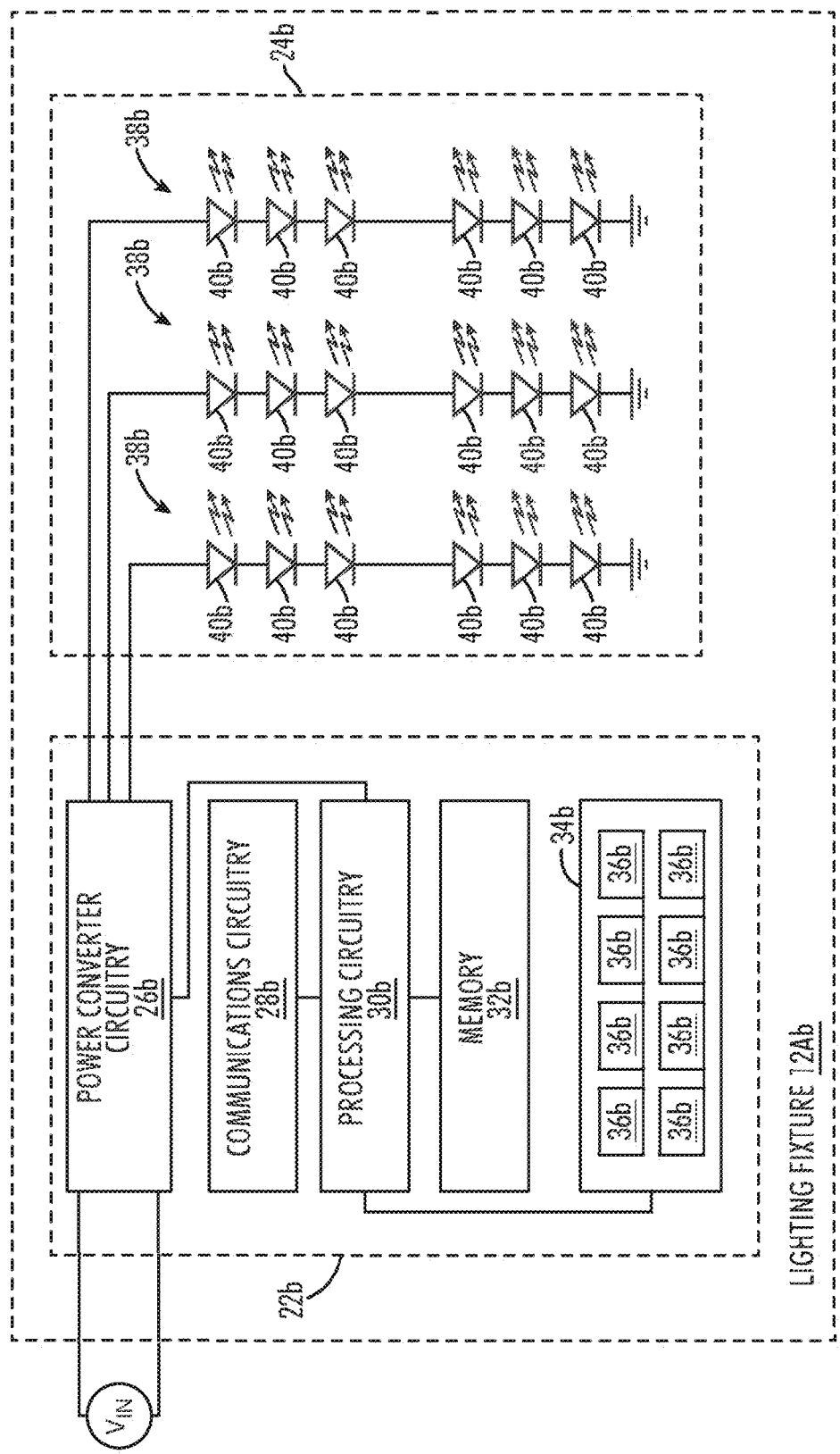
FIG. 15 is a diagram illustrating a lighting fixture according to one embodiment of the present disclosure.

FIG. 15 is a block diagram illustrating details of a lighting fixture 12Ab according to one embodiment of the present disclosure. The lighting fixture 12Ab includes driver circuitry 22b and an array of LEDs 24b. The driver circuitry 22b includes power converter circuitry 26b, communications circuitry 28b, processing circuitry 30b, a memory 32b, and sensor circuitry 34b. The power converter circuitry 26b is configured to receive an alternating current (AC) or direct current (DC) input signal ($V_{IN}$) and perform power conversion to provide regulated output power to the array of LEDs 24b. In one embodiment, the power converter circuitry 26b is configured to provide a pulse-width modulated (PWM) regulated output signal to the array of LEDs 24b such that the light output thereof can be precisely controlled. While not shown, a connection between the power converter circuitry 26b and each one of the communications circuitry 28b, the processing circuitry 30b, the memory 32b, and the sensor circuitry 34b may provide regulated power to these portions of the driver circuitry 22b as well. The processing circuitry 30b may provide the main intelligence of the lighting fixture 12Ab, and may execute instructions stored in the memory 32b to do so. The processing circuitry 30b may thus control the amount of current, voltage, or both provided from the power converter circuitry 26b to the array of LEDs 24b. The communications circuitry 28b may enable the lighting fixture 12Ab to communicate via wireless or wired signals to one or more other lighting fixtures 12Ab, lighting controls 12Bb, or other devices 14b. The communications circuitry 28b may be coupled to the processing circuitry 30b such that information received via the communications circuitry 28b can be considered and acted upon by the processing circuitry 30b. The sensor circuitry 34b may include any number of different sensors 36b. For example, the sensor circuitry 34b may include one or more passive infrared (PIR) occupancy sensors, one or more ambient light sensors, one or more microphones, one or more speakers, one or more ultrasonic sensors and/or transducers, one or more infrared receivers, one or more imaging sensors such as a camera, a multi-spectral imaging sensor, or the like, one or more atmospheric pressure sensors, one or more temperature and/or humidity sensors, one or more air quality sensors such as oxygen sensors, carbon dioxide sensors, volatile organic compound (VOC) sensors, smoke detectors, and the like, one or more positioning sensors such as accelerometers, Global Positioning Satellite (GPS) sensors, or the like, one or more magnetic field sensors, or any other sensors. The sensor circuitry 34b may be in communication with the processing circuitry 30b such that information from the sensors 36b can be considered and acted upon by the processing circuitry 30b. In some situations, the processing circuitry 30b may use information from the sensors 36b to adjust the voltage and/or current provided form the power converter circuitry 26b to the array of LEDs 24b, thereby changing one or more aspects of the light provided by the lighting fixture 12Ab. In other situations, the processing circuitry 30b may communicate information from the sensors 36b via the communications circuitry 28b to one or more other devices. In still other situations, the lighting fixture 12Ab may both change one or more aspects of the light provided therefrom based on information from the one or more sensors 36b and communicate the information from the one or more sensors 36b via the communications circuitry 28b.

In one embodiment, the processing circuitry 30b may combine data from multiple sensors to detect one or more conditions. For example, sensor data from an image sensor may be combined or "fused" with sensor data from a PIR occupancy sensor to accurately detect occupancy, paths of movement, or any other condition. In general, the sensor data from two or more sensors may be combined in any number of ways to detect a desired condition such as occupancy, occupancy level (i.e., the number of people in a given space), paths of movement, the state or location of inventory, or any other environmental condition.

The array of LEDs 24b includes multiple LED strings 38b. Each LED string 38b includes a number of LEDs 40b arranged in series between the power converter circuitry 26b and ground. Notably, the disclosure is not limited to lighting fixtures 12Ab having LEDs 40b arranged in this manner. The LEDs 40b may be arranged in any series/parallel combination, may be coupled between contacts of the power converter circuitry 26b, or arranged in any other suitable configuration without departing from the principles described herein. The LEDs 40b in each one of the LED strings 38b may be fabricated from different materials and coated with different phosphors such that the LEDs 40b are configured to provide light having different characteristics than the LEDs in each other LED string 38b. For example, the LEDs 40b in a first one of the LED strings 38b may be manufactured such that the light emitted therefrom is green, and include a phosphor configured to shift this green light into blue light. Such LEDs 40b may be referred to as blue-shifted green (BSG) LEDs. The LEDs 40b in a second one of the LED strings 38b may be manufactured such that the light emitted therefrom is blue, and include a phosphor configured to shift this blue light into yellow light. Such LEDs 40b may be referred to as blue-shifted yellow (BSY) LEDs. The LEDs 40b in a third one of the LED strings 38b may be manufactured such that the light emitted therefrom is red, and may be referred to as red (R) LEDs 40b. The light output from each LED string 38b may combine to provide light having a desired hue, saturation, brightness, color temperature, color rendering index, and the like. Any different types of LEDs 40b may be provided in each one of the LED strings 38b to achieve any desired light output or any desired range of light output. The power converter circuitry 26*b* may be capable of individually changing the voltage and/or current through each LED string 38*b* such that the hue, saturation, brightness, color temperature, color rendering index, and the like, provided by the array of LEDs 40*b* can be adjusted.

Figure 16:
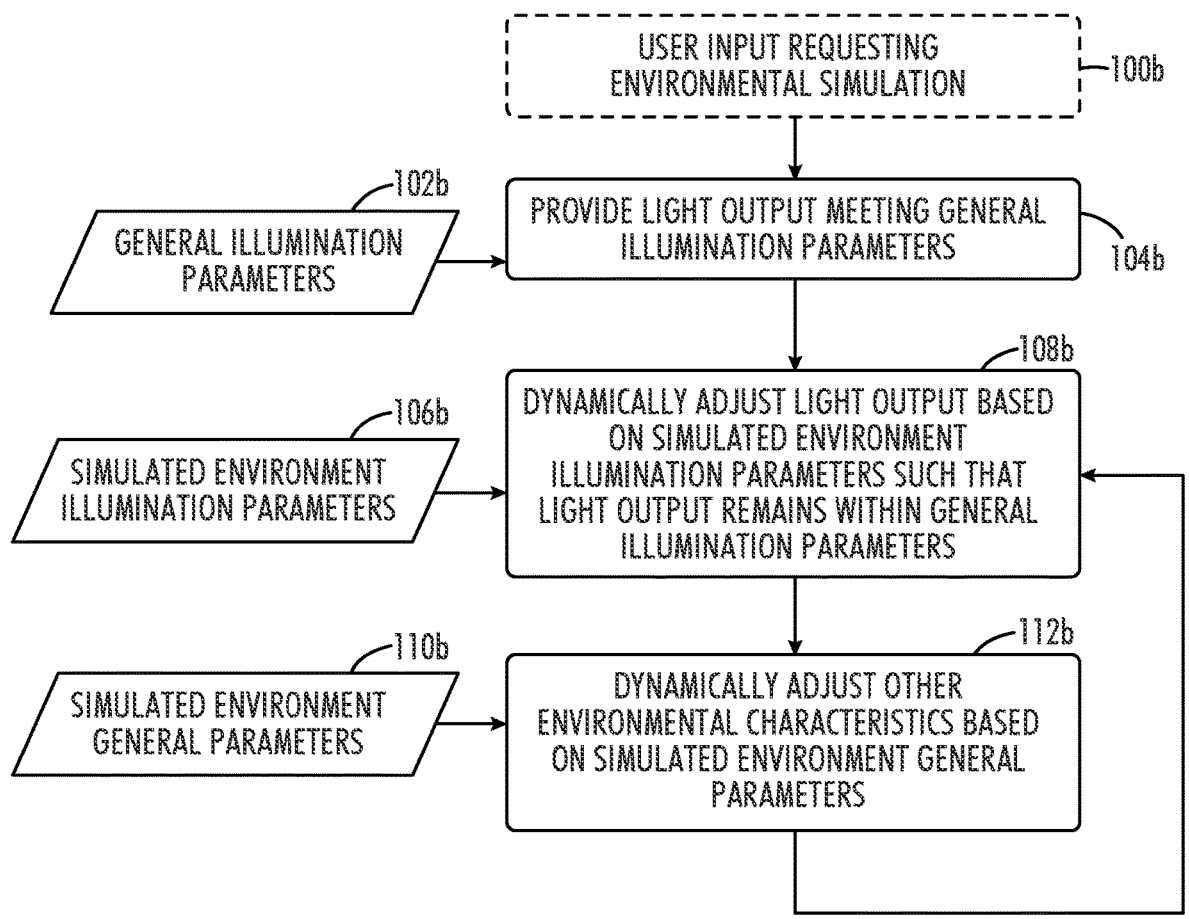
FIG. 16 is a flow diagram illustrating a process for creating a desired environment in an indoor space.

The improvements discussed above may enable a lighting fixture 12Ab, a group of lighting fixtures 12Ab, or a group of lighting fixtures 12Ab and other devices 14*b* to create indoor environments suitable for cultivating desired mental states and/or improving wellbeing. For example, a lighting fixture 12Ab, a group of lighting fixtures 12Ab, or a group of lighting fixtures 12Ab and other devices 14*b* may be used to simulate or otherwise evoke a natural outdoor environment in an indoor space. While lighting effects for theater or other performances have previously been used to portray a specific environment or environmental condition in stage settings, these lighting effects are not suitable for indoor spaces in which individuals are required to work such as commercial spaces (e.g., office buildings), hospitals, schools, universities, sports facilities, factories, and the like. In other words, these lighting effects do not provide light suitable for general illumination. In this regard, the lights used to perform these effects are generally not even suitable for providing light suitable for normal tasks, as they are often bright, highly directional, and mounted directionally or on multi-axis gimbals for positioning. FIG. 16 is a flow diagram illustrating a method for creating an indoor environment suitable for working environments such as those listed above that is tailored to provide a desired effect while also providing light suitable for general illumination. Specifically, FIG. 16 illustrates a process for imitating, simulating, or otherwise invoking a feeling of being in a natural outdoor environment in an indoor space while maintaining light suitable for general illumination therein. Rather than providing an exact replica of the lighting and other environmental conditions in a natural outdoor space, the process discussed below with respect to FIG. 16 is focused on giving a subtle impression thereof, giving individuals within the indoor space a perception of the natural outdoor environment without actually being in it. The process discussed with respect to FIG. 16 is targeted for use in lights located in indoor environments suited for general working tasks such as those discussed above. Accordingly, the process discussed with respect to FIG. 16 is targeted for implementation by lights often used in these environments such as troffer lights provided in a drop ceiling, down lights, or the like.

The process is optionally triggered based on input from a user requesting simulation of a particular environment (step 100*b*). In response thereto or based on a different trigger such as a schedule, a set of general illumination parameters (step 102*b*) are used to provide light from one or more lighting fixtures 12Ab (step 104*b*). As discussed above, these general illumination parameters may include characteristics such as hue, saturation, brightness, color, color temperature, color rendering index, and the like. Further, these general illumination parameters may include a range of acceptable values for any of these characteristics. Next, a set of simulated environment illumination parameters (step 106*b*) are used to dynamically adjust the light output of the one or more lighting fixtures 12Ab (step 108*b*). For example, if the simulated environment illumination parameters are meant to evoke a feeling of being in a cloud covered outdoor environment, the light output of the one or more lighting fixtures 12Ab may be dynamically adjusted to imitate shadows produced by the clouds in this environment. As another example, if the simulated environment illumination parameters are meant to evoke a feeling of being in a rainy outdoor environment, the light output of the one or more lighting fixtures 12Ab may be dynamically adjusted to imitate the absorption, reflection, and refraction of light caused by the clouds and rain in this environment. Notably, this dynamic adjustment is accomplished while maintaining the general illumination parameters discussed above such that the indoor space is still suitable for work tasks (e.g., reading, writing, meetings, teaching, etc.).

There are several ways to maintain the general illumination parameters while dynamically changing the light output from the one or more lighting fixtures 12Ab based on the simulated environment illumination parameters. In one embodiment, a change in the light output of one of the lighting fixtures 12Ab is compensated for by an adjacent or otherwise nearby lighting fixture 12Ab such that an average light output of the lighting fixtures 12Ab in a particular area meets the general illumination parameters while also dynamically changing to evoke feelings of the desired outdoor or natural environment. This could mean, for example, that as the brightness of one of the lighting fixtures 12Ab decreases to simulate the shadow of a passing cloud, the brightness of another adjacent or otherwise nearby lighting fixture 12Ab increases to compensate. Similar compensation can be performed for any light characteristic such as hue, saturation, color temperature, color rendering index, or the like. One or more sensors 36*b* in the sensor circuitry 34*b* of each of the lighting fixtures 12Ab may monitor the light output in the area to ensure that the general illumination parameters are maintained throughout the dynamic changing of the light output of the lighting fixtures 12Ab, adjusting the light output of one or more of the lighting fixtures 12Ab as necessary to maintain the general illumination parameters. Additionally, sensors on the lighting controls 12Bb or other devices 14*b* may be used to perform the same task. In another embodiment, the totality or average of the light output from multiple lighting fixtures 12Ab may change such that the general illumination parameters are maintained by an average light output of the lighting fixtures 12Ab over a predefined period of time, with instantaneous excursions from the general illumination parameters occurring. In such an embodiment, the predefined period of time may be chosen such that the excursions from the general illumination parameters are not disruptive to the individuals in the space.

Further to the above, the dynamic adjustment of the light output while maintaining the general illumination parameters may be accomplished by a single lighting fixture 12Ab or multiple lighting fixtures 12Ab. In the case of a single lighting fixture 12Ab, this may simply mean dynamically adjusting one or more characteristics of the light output thereof such that they change over time but remain within a range specified by the general illumination parameters, which prevent said dynamic adjustment from being too distracting or overwhelming. Using additional lighting fixtures 12Ab allows for more flexibility in the light output of each individual lighting fixture 12Ab, such that one or more of the lighting fixtures 12Ab can deviate one or more light output characteristics thereof from a given range in the general illumination parameters. This is because one or more other lighting fixtures 12Ab may compensate for the more intense dynamic adjustment of light output such that the average light output by the lighting fixtures 12Ab still remains within the general illumination parameters and thus is not too distracting or overwhelming.

Finally, a set of simulated environment general parameters (step 110*b*) are used to dynamically adjust other environmental characteristics (step 112b). As discussed herein, the simulated environment general parameters are any parameters not relating to illumination. These may include, for example, parameters for characteristics such as sounds, temperature, air circulation, and the like. In one exemplary embodiment in which the lighting fixtures 12Ab include speakers and/or one or more of the other devices 14b includes or is a speaker, the simulated environment general parameters may specify a set of sounds to be played within the indoor space to further evoke feelings of being in a desired outdoor or natural environment. Generally, the simulated environment general parameters supplement or enhance the simulated environment illumination parameters to make the experience more immersive. For example, sounds of rain, thunder, or wind may supplement the simulated environment illumination parameters associated with a rainy outdoor environment. Once again, sensors on the lighting fixtures 12Ab, the lighting controls 12Bb, or the other devices 14b may monitor the other environmental characteristics to ensure that the dynamic adjustment thereof falls below a set of general environment parameters such that individuals within the indoor space are not disrupted thereby.

The result of the above is a simulation of an outdoor or natural environment that subtly evokes a feeling of being in the desired outdoor or natural environment without being disruptive to the individuals in the indoor space such that they can still accomplish their desired tasks. Multiple environmental conditions such as light, sound, temperature, and the like may be dynamically changed together to provide cues relating to the desired outdoor or natural environment that are not overly distracting or overwhelming. Distributing the sources for these environmental conditions throughout a space may further enhance the experience. For example, the larger the number of lighting fixtures 12Ab that participate in the simulation, the more immersive it may be come. Similarly, if a number of speakers are distributed throughout the indoor space (in the lighting fixtures 12Ab or otherwise), the sound aspect of the simulation may become more immersive. Notably, the dynamic adjustment of the environmental conditions may be different for each device. For example, the lighting fixtures 12Ab may each dynamically change their light output in a different manner to better simulate what occurs in a natural outdoor environment. Similarly, speakers throughout a space may each play different sounds, all of which combine to evoke the outdoor or natural environment.

As discussed above, sound may be an important environmental characteristic used to evoke the cognitive impression of an outdoor or natural environment. Various examples of sounds that may be introduced via speakers distributed throughout an indoor space (in the lighting fixtures 12Ab or otherwise) may include the communications calls or sounds from flight or other motion of bees, birds, owls, crickets, cicadas, or other insects, sounds of the ocean (e.g., waves), running water in a stream, river, or waterfall, sounds from mammals such as cows, wolves, coyotes, horses, and dogs, ambient noises from city centers, cafes, coffee shops, and the like, sounds from flags, trees, grass, and leaves blowing in the wind, and sounds from natural phenomena such as thunder, rain, and the like.

As discussed briefly above, the general illumination parameters may include a range of values suitable for hue, saturation, brightness, color temperature, color rendering index, and the like. With respect to color temperature, this range may be between 1700 k to 8000 k, and more specifically 2700 k to 5700 k. With respect to color rendering index, this range may be between 60 and 100, and more specifically between 70 and 100 or 80 and 100. With respect to brightness, this range may be at least partially dependent on the type of light used. For a 2' by 2' lighting fixture of the type often mounted in a drop ceiling, a brightness between 2000 lux and 4000 lux may be used. For a 2' by 2' lighting fixture of the type often mounted in a drop ceiling, luminous flux emitted may be between 2000 lm and 5000 lm. For a 2' by 4' lighting fixture of the same type, a luminous flux between 3000 lm and 7000 lm may be used, dimming as requested to any intermediate level down to 5%, 1%, or even 0% of those ranges. This may translate to a brightness on task surfaces illuminated by the lights between about 30 foot-candles (300 lux) and 100 foot-candles (1000 lux), dimming as requested to any intermediate level down to 5%, 1%, or even 0% of those ranges. In terms of surface luminance of the self-luminous or illuminated surfaces of the fixture, this may be between 1000 nit (cd/m2) and 10,000 nit (cd/m2), subject to dimming in relative % as discussed above. The color temperature of the mixed illumination emitted by the fixture may be between 1000 k and 12,000 k, and the color rendering index of the mixed illumination emitted by the fixture may be between 65 and 100. In terms of the chromaticity of the top (Sky) panel, the typical adjustable color falls in a gamut triangle ranging from 0.2033, 0.0784 to 0.5157, 0.5731 to 0.2116, 0.4824 in u'v' space. In terms of the chromaticity of the side (Sun) panels, the typical adjustable color falls in a gamut triangle ranging from 0.1644, 0.4850 to 0.1624, 0.5510 to 0.4033, 0.5116 in u'v' space. While dependent on the light source, the clear aperture (the area of the virtual plane from which illumination exits) of each light source may be much larger than that typically seen in stage lighting scenarios, generally in excess of 4 square feet in the case of square ceiling mounted troffer-type lighting fixtures and down to 1 square foot in the case of certain recessed downlights such as a 6" round downlight. Further, the light is much more uniform than that used in stage lighting scenarios, such that a luminance uniformity thereof is better than +/−15% across the whole of the luminous surface of the top (Sky) panel or across each of the side (Sun) panels. Color uniformity may be better than +1=0.005 or 0.010 in u'v' color space across these same surfaces. Beam angle for the lights may be between 60 and 140 degrees' full width half max. Beam candlepower may be between 10 and 1000 cd.

The simulated environment illumination parameters and the simulated environment general parameters may include a predefined set of parameters that specify variations in light or other environmental characteristics over time. That is, the simulated environment illumination parameters and the simulated environment general parameters may define values for illumination (e.g., hue, saturation, brightness, color temperature, color rendering index, or the like) or other environmental characteristics (e.g., sound, temperature, air circulation, or the like) that vary over time and are "played" to simulate the outdoor or natural environment. Additionally, the simulated environment illumination parameters and the simulated environment general parameters may be dynamically generated based on predefined criteria associated with a variety of outdoor or natural environments.

Figure 17:
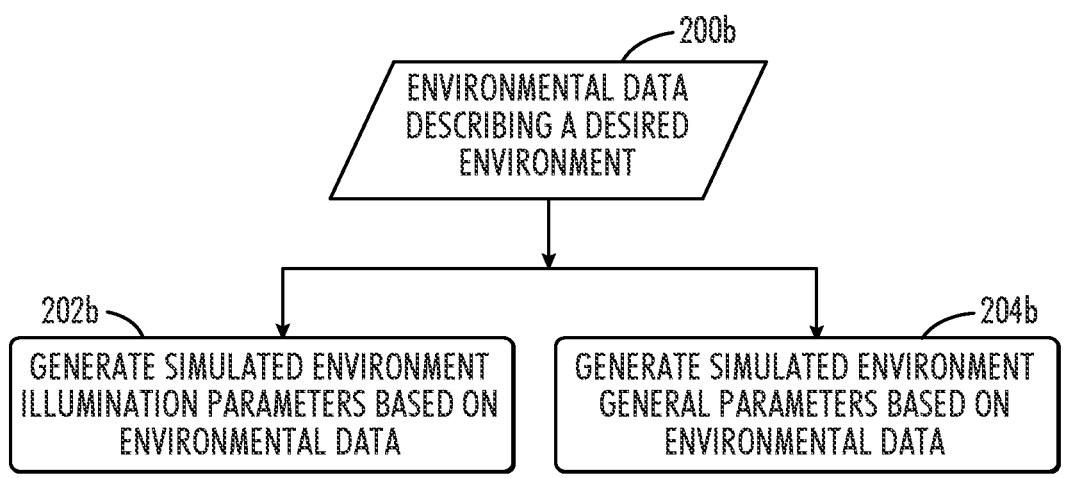
FIG. 17 is a flow diagram illustrating a process of obtaining a set of simulated environment illumination parameters and simulated environment general parameters according to one embodiment of the present disclosure.

In this regard, FIG. 17 illustrates a process for obtaining the simulated environment illumination parameters and the simulated environment general parameters. Starting with environmental data describing a desired environment (step 200b), the simulated environment illumination parameters are dynamically generated (step 202b) and the simulated environment general parameters are dynamically generated (step 204b). The environmental data describing a desired environment may include illumination conditions and other environmental conditions such as weather information, sounds, and the like. The environmental data may be stored in a database or obtained from a sensor. If the environmental data is obtained from a sensor, the sensor may be local (i.e., outside but near the indoor space such that it is connected via a LAN) or remote (i.e., in a completely different location and connected via WAN). The environmental data may be any level of granularity and processing. In some embodiments, the environmental data is raw sensor data that is then processed to generate the simulated environment illumination parameters and the simulated environment general parameters. In other embodiments the environmental data is pre-processed in some way.

FIG. 18 illustrates a process for obtaining the simulated environment illumination parameters and the simulated environment general parameters according to another embodiment of the present disclosure. The process once again starts with the environmental data describing the desired environment (step 300b), which, as discussed above can be raw sensor data or pre-processed data about the desired environment. This environmental data is matched to a number of predefined environmental conditions (step 302b). For example, sensor data may be examined to see if it is raining outside. If so, this is matched to a predefined environmental condition for "rainy," which is used to retrieve a set of predefined simulated environment illumination parameters and predefined simulated environment general parameters (step 304b).

Notably, the above ways to obtain the simulated environment illumination parameters and the simulated environment general parameters are merely exemplary. The simulated environment illumination parameters and the simulated environment general parameters may be obtained in any suitable manner without departing from the principles herein.

The process described above for simulating an environment in an indoor space is intended for use with lighting fixtures 12Ab typically found in commercial spaces such as downlights and troffers provided in a drop ceiling. With this in mind, certain types of lighting fixtures 12Ab may be especially suited to simulating outdoor environments. In particular, lighting fixtures 12Ab that imitate the light provided from a skylight, such as those described in co-assigned and co-pending U.S. patent application Ser. No. 15/419,538, the contents of which are hereby incorporated by reference in their entirety, may be especially well suited to imitating outdoor or natural lighting conditions. These types of lighting fixtures may give the subtle impression of a recessed skylight, and may include a top panel capable of illuminating a highly uniform visible surface with a color like the clear blue sky, a cloudy sky, or any blend there between. The fixture may include any number of sidewalls also capable of displaying a highly uniform surface color. The top panel and sidewalls may change their color based on the time of day or any other pattern to give the impression of a skylight at different times of day. FIG. 19 shows an exemplary skylight lighting fixture 42b according to one embodiment of the present disclosure. The skylight lighting fixture 42b includes a first light engine 44b, a second light engine 46b, and a first sidewall 48b that defines a space (in the form of a recessed box, i.e., a horizontal plane through the first sidewall 48b would intersect the first sidewall 48b in a hollow square pattern). The skylight lighting fixture 42b is mounted in a ceiling 50b which adjoins a wall 52b. A beam of light 54b exits from the second light engine 46b.

The first light engine 44b comprises an edge-lit panel (or direct-lit panel), and the second light engine 46b comprises a downlight. The first sidewall 48b comprises at least a first sidewall aperture 56b. The second light engine 46b is positioned and oriented such that light therefrom passes through the first sidewall aperture 56b through an optional screen 58b covering the first sidewall aperture 56b. A low-profile sensor pod 60b may be mounted in or on the ceiling 50b and include at least an ambient light sensor, or a PIR occupancy sensor in addition to any other sensors. To maintain the low profile of such a sensor pod 60, a flat lens system for the PIR occupancy sensor may be required, such as that described in detail in co-assigned and co-pending U.S. Patent Publication No. 2016/0195252A1, the contents of which are hereby incorporated by reference in their entirety. Details of the skylight lighting fixture 42b are discussed in detail in U.S. patent application Ser. No. 15/419,538 incorporated above. The light provided by the first light engine 44b and the second light engine 46b is capable of imitating that provided by a skylight on a sunny day. Adjusting the light output of the first light engine 44b and the second light engine 46b according to the principles discussed above may enable other environmental conditions (e.g., cloudy, rainy, etc.) to be imitated quite accurately as well. Accordingly, one or more of the lighting fixtures 12Ab in the lighting network 10b discussed above may comprise a skylight lighting fixture such as the one described herein.

FIG. 20 shows a downlight style lighting fixture 62b according to one embodiment of the present disclosure. The downlight style lighting fixture 62b includes a housing 64b, which supports a light source (not shown) from which light is provided. A lens 66b covers the light source and may filter light emanating therefrom. An electronics module (not shown) may be located within the housing 64b, and may include various circuitry, such as that described above with respect to FIG. 15, configured to control one or more light output parameters of the light source and perform one or more additional functions. A reflector (not shown) may be attached to the housing 64b, for example, via one or more mounting holes 68b, which may extend the housing 64b such that the downlight style lighting fixture 62b may be used as a recessed lighting fixture for hanging in an opening in a ceiling.

FIG. 21 shows a troffer style lighting fixture 70b according to one embodiment of the present disclosure. The troffer style lighting fixture 70b includes a housing 72b, which supports a light source (not shown) from which light is provided. A heat sink 74b may be coupled to the light source in order to divert heat away from the light source. Light from the light source may be provided indirectly such that the light provided from the light source is reflected from an inside portion of the housing 72b and through a lens 76b. The lens 76b may filter the light emanating from the light source. An outer surface 78b of the housing 72b may act as a reflector, directing light from the light source in a desired direction. An electronics module (not shown) may be located within the housing 72b, and may include various circuitry such as that discussed above with respect to FIG. 15.

FIG. 22 illustrates exemplary conditions for a lighting system suitable for general illumination. Starting in the opt left, measurements for luminous flux, lumens per watt (LPW), correlated color temperature (CCT), color rendering index (CRI), and solder point temperature (Tsp) are shown for a first lighting fixture FIXA and a second lighting fixture FIXB, which may be different types of lighting fixtures. In the lower left, a graph displays suitable values for perpendicular luminance in lux for a first lighting fixture FIXA, a second lighting fixture FIXB, a third lighting fixture FIXc, and a fourth lighting fixture FIXE. On the right, a diagram indicates the different illumination areas over which general illumination parameters can be measured and enforced.

Figure 23:
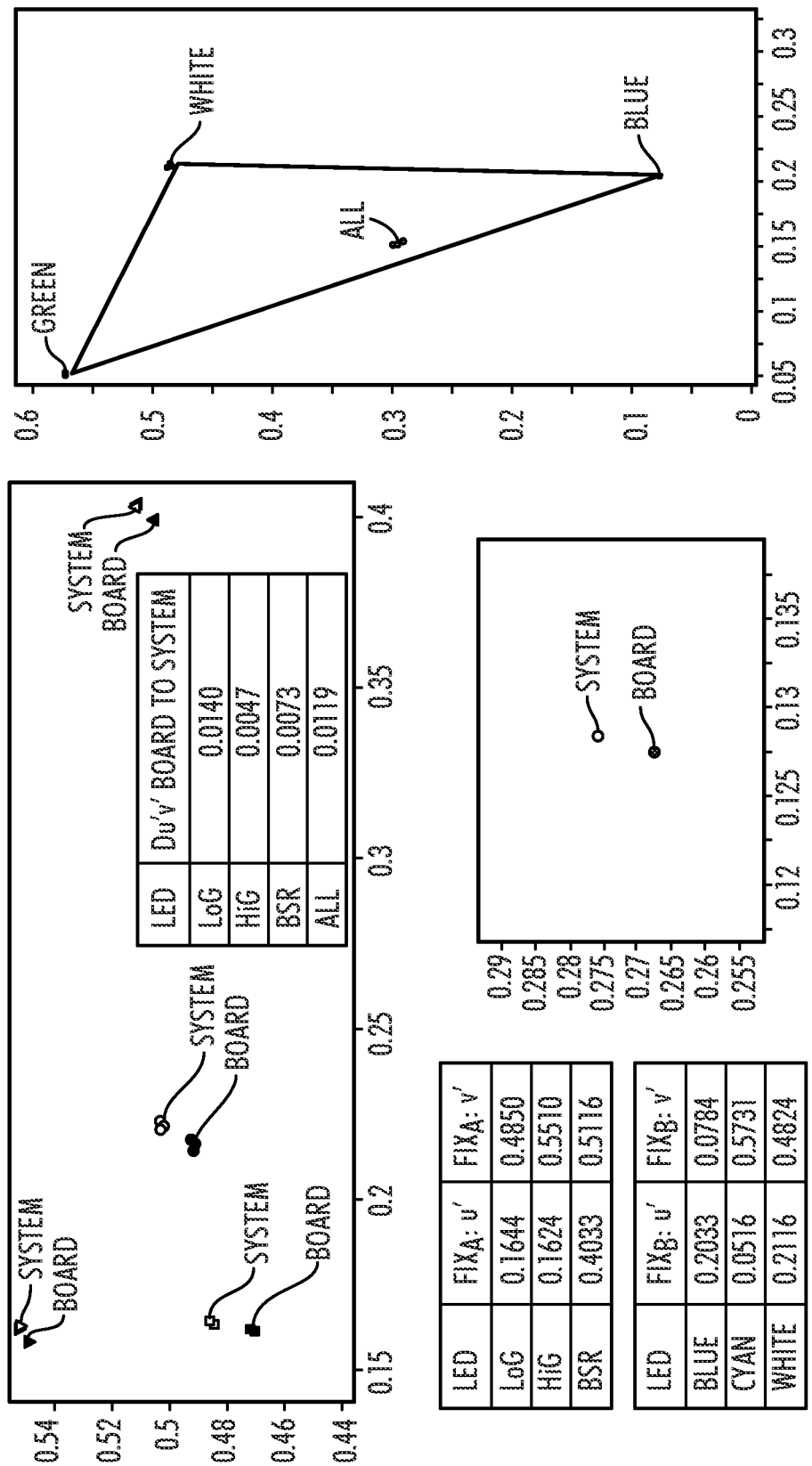

FIG. 23 includes a number of color gamut triangles for various lighting fixtures, and may illustrate values that are suitable for general illumination that may be included in the general illumination parameters in some embodiments. Certain points on the color gamut triangles are specified for a bare board system (e.g., a light engine), while others specify the points for a lighting system, which may include multiple light engines. Color space measurements for different fixtures (FIXA and FIXB) may indicate acceptable color space values that may be included in the general illumination parameters in various embodiments.

FIG. 24 shows graphs illustrating luminance ranges for a first lighting fixture and a second lighting fixture, measured in both horizontal and vertical axes from the lighting fixtures. These luminance ranges and their uniformity may be included in the general illumination parameters in various embodiments.

Figure 25:
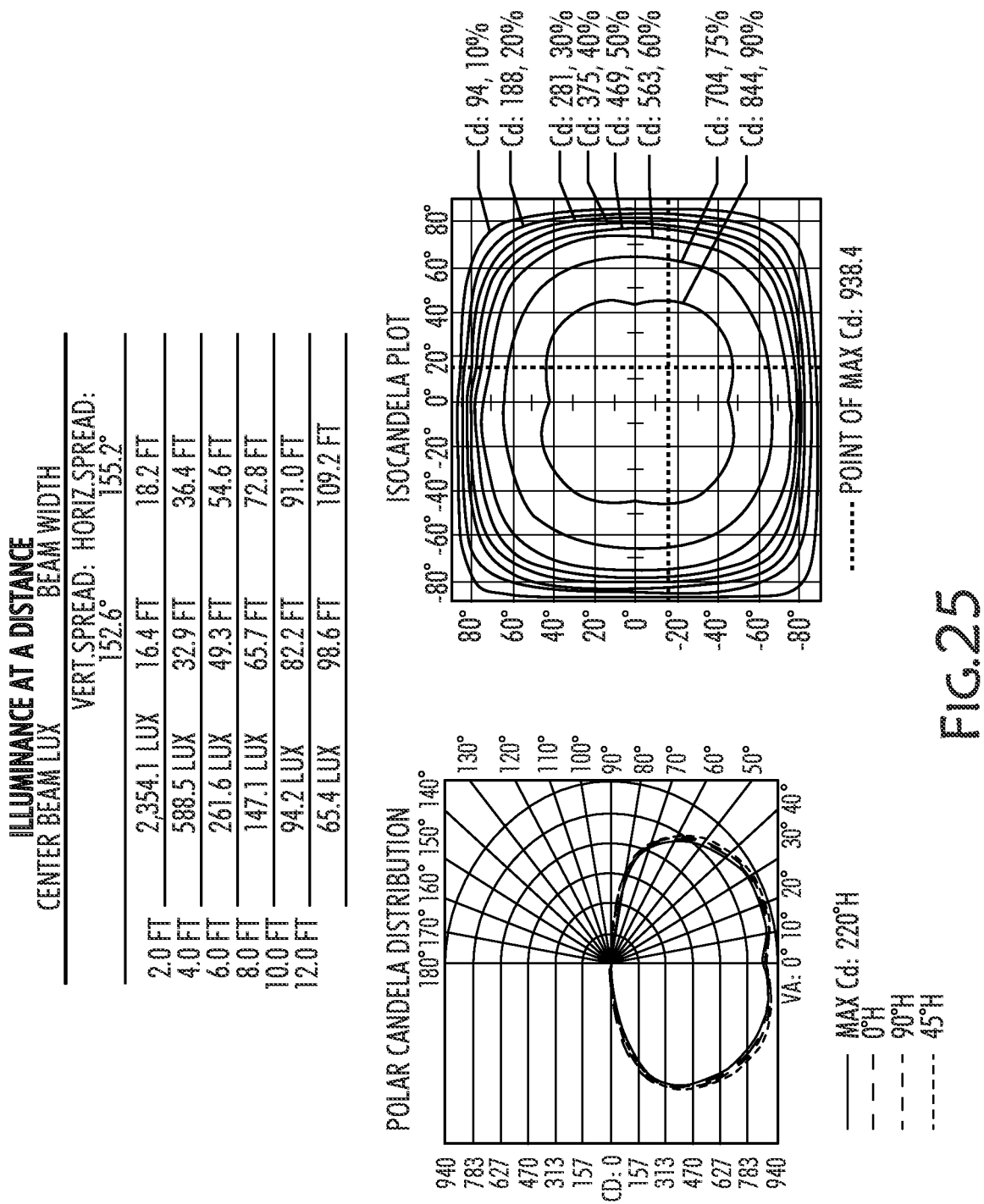

FIG. 25 shows graphs indicating parameters that may be included in the general illumination parameters specifying illumination at a distance (top middle), polar candela distribution (bottom left), and values in an isocandela plot (bottom right). These parameters may be included in the general illumination parameters in various embodiments.

Those skilled in the art will recognize improvements and modifications to the preferred embodiments of the present disclosure. All such improvements and modifications are considered within the scope of the concepts disclosed herein and the claims that follow.

What is claimed is:

1. A dynamic lighting system for simulating an environment, comprising:
    a plurality of lighting fixtures, each one of the plurality of lighting fixtures comprising:
        a light source;
        sensor circuitry, wherein the sensor circuitry comprises an ambient light sensor, an occupancy sensor, one or more image sensors, and a temperature sensor;
        communications circuitry, wherein the each of the plurality of lighting fixtures is in network communication via the communications circuitry; and
        driver circuitry to control the light source, comprising:
            processing circuitry; and
            memory coupled to the processing circuitry, the memory storing instructions, which, when executed by the processing circuitry, cause the lighting fixture to:
                receive dynamic lighting simulation instructions, the dynamic lighting simulation instructions including simulated environment illumination parameters, wherein the simulated environment illumination parameters further comprise general illumination parameters, and wherein the general illumination parameters comprise at least a desired level of brightness;
                generate, in response to receiving the dynamic lighting simulation instructions, light output characteristics from the light source, based on the simulated environment illumination parameters via the driver circuitry configured to control the light source;
                adjust dynamically, the light output characteristics from the light source over a time series, based on the simulated environment illumination parameters via the driver circuitry configured to control the light source to simulate the environment, and such that the general illumination parameters maintain general illumination light output characteristics while the simulated environment illumination parameters dynamically adjust over the time series the light output characteristics from the light source to simulate the environment.

2. The system of claim 1, wherein the processing circuitry is configured to transmit instructions to generate the light output characteristics from the light source.

3. The system of claim 1, wherein the memory includes further instructions, which, when executed by the processing circuitry cause the lighting fixture to:
    receive updated dynamic lighting simulation instructions via the communications circuitry, the updated dynamic lighting simulation instructions including an instruction to pause the generating of the light output characteristics from the light source; and
    adjust the driver circuitry for controlling the light output characteristics from the light source over the time series, such that the simulated environment illumination parameters pause transitioning from a current state.

4. The system of claim 1, wherein the general illumination parameters further comprise hue, saturation, brightness, color, color temperature, and color rendering index.

5. The system of claim 4, wherein the general illumination parameters comprise the color rendering index in a range between 60 and 100, 70 and 100, or 80 and 100.

6. The system of claim 1, wherein the simulated environment illumination parameters comprise hue, saturation, brightness, color, color temperature, and color rendering index that is dynamically adjusted over the time series to simulate the environment.

7. The system of claim 1, wherein the memory includes further instructions, which, when executed by the processing circuitry cause the lighting fixture to:
    receive updated dynamic lighting simulation instructions via the sensor circuitry, wherein the sensor circuitry is configured to acquire the light output characteristics from the each of the plurality of lighting fixtures; and
    adjust dynamically, the light output characteristics from the light source over the time series, in dependence on the updated dynamic lighting simulation instructions from the sensor circuitry.

8. The system of claim 1, wherein the sensor circuitry further comprises one or more microphones; one or more speakers; one or more ultrasonic sensors or transducers; one or more infrared receivers; one or more atmospheric pressure sensors; one or more humidity sensors; one or more air quality sensors; one or more positioning sensors; or one or more magnetic field sensors.

9. A computer implemented method for dynamically controlling light to simulate an environment, comprising:
    providing one or more light fixtures, each with a light source, processing circuitry, communications circuitry, sensor circuitry, and driver circuitry, wherein the sensor circuitry comprises an ambient light sensor, an occupancy sensor, one or more image sensors, and a temperature sensor;
    receiving, by the one or more light fixtures, instructions for dynamically transitioning the light output characteristics provided by the light source on the one or more light fixtures based on general illumination parameters and simulated environment illumination parameters; and dynamically adjusting, by the one or more light fixtures, light output characteristics provided by the light source of the one or more lighting fixtures, wherein dynamically adjusting the light output characteristics maintains the general illumination parameters and adjusts the simulated environment illumination parameters over a time series.

10. The method of claim 9, wherein the general illumination parameters comprise hue, saturation, brightness, color, color temperature, and color rendering index.

11. The method of claim 9, wherein the simulated environment illumination parameters comprise hue, saturation, brightness, color, color temperature, and color rendering index, all of which are variable over the time series.

12. The method of claim 9, further comprising receiving by the sensor circuitry, on the one or more light fixtures, the light output characteristics from the light output of the light source on the one or more light fixtures, and dynamically adjusting the light output characteristics based on input from the sensor circuitry transmitting instructions to the processing circuitry to maintain the general illumination parameters and the simulated environment illumination parameters via the driver circuitry.

13. The method of claim 9, further comprising providing at least one of a sound, a temperature change, or air circulation from another device based on the instructions for dynamically adjusting, by the one or more light fixtures, the light output characteristics of the light provided by the light source of the one or more lighting fixtures.

14. The method of claim 9, wherein the simulated environment illumination parameters are raw sensor data obtained via a network and provided as instructions to the processing circuitry.

15. The method of claim 9, wherein the simulated environment illumination parameters comprise information from processed sensor data obtained via a network and provided as instructions to the processing circuitry.

16. The method of claim 9, wherein the sensor circuitry further comprises one or more microphones; one or more speakers; one or more ultrasonic sensors or transducers; one or more infrared receivers; one or more atmospheric pressure sensors; one or more humidity sensors; one or more air quality sensors; one or more positioning sensors; or one or more magnetic field sensors.

17. A computer implemented method for dynamically controlling light, comprising:
providing a light fixture with a light source, processing circuitry, communications circuitry, sensor circuitry, and driver circuitry, wherein the sensor circuitry comprises an ambient light sensor, an occupancy sensor, one or more image sensors, and a temperature sensor;
receiving, by the light fixture, instructions for dynamically transitioning light output characteristics from the light source based on general illumination parameters and simulated environment illumination parameters;
maintaining, by the light fixture, the light output characteristics provided by the light source that maintains the general illumination parameters based on instructions received from the sensor circuitry; and
dynamically adjusting, by the light fixture, the light output characteristics provided by the light source of the light fixture, wherein dynamically adjusting provides adjustment to the light output characteristics based on the simulated environment illumination parameters over a time series to reflect a simulated environment.

18. The method of claim 17, wherein the simulated environment illumination parameters comprise information from processed sensor data obtained via a network and provided as instructions to the processing circuitry.

19. The method of claim 17, wherein the sensor circuitry further comprises one or more microphones; one or more speakers; one or more ultrasonic sensors or transducers; one or more infrared receivers; one or more atmospheric pressure sensors; one or more humidity sensors; one or more air quality sensors; one or more positioning sensors; or one or more magnetic field sensors.

* * * * *